US012739506B2

(12) United States Patent
Uchida

(10) Patent No.: US 12,739,506 B2
(45) Date of Patent: Sep. 15, 2026

(54) INFORMATION PROCESSING APPARATUS, LEARNING DEVICE, IMAGING APPARATUS, CONTROL METHOD OF INFORMATION PROCESSING APPARATUS, AND PROGRAM

(71) Applicant: FUJIFILM Corporation, Tokyo (JP)

(72) Inventor: Akihiro Uchida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 180 days.

(21) Appl. No.: 18/146,442

(22) Filed: Dec. 26, 2022

(65) Prior Publication Data

US 2023/0131704 A1 Apr. 27, 2023

Related U.S. Application Data

(63) Continuation of application No. PCT/JP2021/021754, filed on Jun. 8, 2021.

(30) Foreign Application Priority Data

Jun. 30, 2020 (JP) ................................ 2020-113522

(51) Int. Cl.
*H04N 23/67* (2023.01)
*G06T 3/40* (2024.01)
(Continued)

(52) U.S. Cl.
CPC ............. *H04N 23/675* (2023.01); *G06T 3/40* (2013.01); *G06V 10/25* (2022.01); *G06V 10/761* (2022.01); *G06V 2201/07* (2022.01)

(58) Field of Classification Search
CPC .. H04N 23/675; H04N 23/617; H04N 23/611; H04N 23/632; H04N 23/635;
(Continued)

(56) References Cited

U.S. PATENT DOCUMENTS 8,111,304 B2 2/2012 Ohtsuka et al.
8,660,344 B2 2/2014 Nakajima
(Continued)

FOREIGN PATENT DOCUMENTS

CN 104113686 10/2014
CN 104871058 8/2015
(Continued)

OTHER PUBLICATIONS

"Notice of Reasons for Refusal of Japan Counterpart Application", issued on Feb. 20, 2024, with English translation thereof, p. 1-p. 11.
(Continued)

*Primary Examiner* — Christopher K Peterson
(74) *Attorney, Agent, or Firm* — JCIPRNET

(57) ABSTRACT

An information processing apparatus includes a processor and a memory connected to or built in the processor. In a case in which imaging accompanied by a focus operation in which a specific subject is used as a focus target region is performed by an image sensor, the processor outputs specific subject data related to a specific subject image indicating the specific subject in a captured image obtained by the imaging as data used in machine learning.

21 Claims, 28 Drawing Sheets

(51) Int. Cl.
*G06V 10/25* (2022.01)
*G06V 10/74* (2022.01)

(58) Field of Classification Search
CPC ........ G06T 3/40; G06V 10/25; G06V 10/761; G06V 2201/07; G06N 20/00
See application file for complete search history.

(56) References Cited

U.S. PATENT DOCUMENTS

| | | | | |
|---|---|---|---|---|
| 8,953,895 | B2 | 2/2015 | Kawanishi et al. | |
| 9,473,694 | B2 | 10/2016 | Inoue | |
| 9,681,037 | B2 | 6/2017 | Sugawara et al. | |
| 10,455,163 | B2 | 10/2019 | Kanatsu | |
| 11,295,426 | B2 | 4/2022 | Horita | |
| 2010/0103286 | A1* | 4/2010 | Akiyama | G03B 7/28 348/333.02 |
| 2016/0019412 | A1* | 1/2016 | Kang | H04N 23/61 382/103 |
| 2019/0387175 | A1 | 12/2019 | Kikuchi et al. | |
| 2020/0112685 | A1* | 4/2020 | Li | H04N 23/675 |
| 2020/0387533 | A1* | 12/2020 | Nolte | G06F 40/279 |
| 2023/0131704 | A1 | 4/2023 | Uchida | |

FOREIGN PATENT DOCUMENTS

| | | |
|---|---|---|
| CN | 110915193 | 3/2020 |
| JP | H04346580 | 12/1992 |
| JP | 2006333443 | 12/2006 |
| JP | 2009055432 | 3/2009 |
| JP | 2009069996 | 4/2009 |
| JP | 2011160044 | 8/2011 |
| JP | 2012133607 | 7/2012 |
| JP | 2013080428 | 5/2013 |
| JP | 2016099668 | 5/2016 |
| JP | 2018036331 | 3/2018 |
| JP | 2018107593 | 7/2018 |
| JP | 2019118097 | 7/2019 |
| JP | 2019215489 | 12/2019 |
| JP | 2020091702 | 6/2020 |
| JP | 7495498 | 6/2024 |
| WO | 2008133237 | 11/2008 |
| WO | 2012073421 | 6/2012 |

OTHER PUBLICATIONS

"Written Opinion of the International Searching Authority (Form PCT/ISA/237) of PCT/JP2021/021754," mailed on Sep. 14, 2021, with English translation thereof, pp. 1-10.
"International Search Report (Form PCT/ISA/210) of PCT/JP2021/021754," mailed on Sep. 14, 2021, with English translation thereof, pp. 1-5.
"Notice of Reasons for Refusal of Japan Counterpart Application", issued on May 7, 2025, with English translation thereof, p. 1-p. 12.
"Office Action of China Counterpart Application", issued on Dec. 8, 2025, with English translation thereof, pp. 1-30.
"Notice of Reasons for Refusal of Japan Counterpart Application", issued on Nov. 4, 2025, with English translation thereof, p. 1-p. 12.
"The Second Office Action of China Counterpart Application", with English translation thereof, issued on Jun. 6, 2026, pp. 1-32.

* cited by examiner 10
11
12
A
B
C
FACE
SA
PA
LA
17A(17)
CAR
SB
PB
LB
17B(17)
SC
FLOWER
PC
LC
17C(17)
14
LEARNING DEVICE
16
DATABASE
17
TRAINING DATA
SPECIFIC SUBJECT DATA
LABEL
FACE
CAR
FLOWER 20
52
UI SYSTEM DEVICE
30
TOUCH PANEL MONITOR
34
MONITOR
36
TOUCH PANEL
60
RECEPTION UNIT
62
HARD KEY UNIT
56
COMMUNICATION I/F
54
EXTERNAL I/F
58
50
CONTROLLER
50C
RAM
NVM
PROGRAM
TRAINING DATA GENERATION PROGRAM
51
51A
50B
CPU
TRAINING DATA GENERATION UNIT
53
50A
50D
CONTROL I/F
50E
INPUT I/F
24
24A
48
37
38
12
22
40
40A
40B
40C
L1
SLIDE MECHANISM
42
M
44
M
46

66
LS
P
S
Q2L
Q1L
QCL = (XCL, YCL)
(LIVE VIEW IMAGE)
Q2E
Q1E
QCE = (XCE, YCE)
(MAIN EXPOSURE IMAGE)
DEGREE OF DIFFERENCE IN CENTER POSITION EXCEEDS POSITION PREDETERMINED RANGE
WARNING INFORMATION
14
LEARNING DEVICE

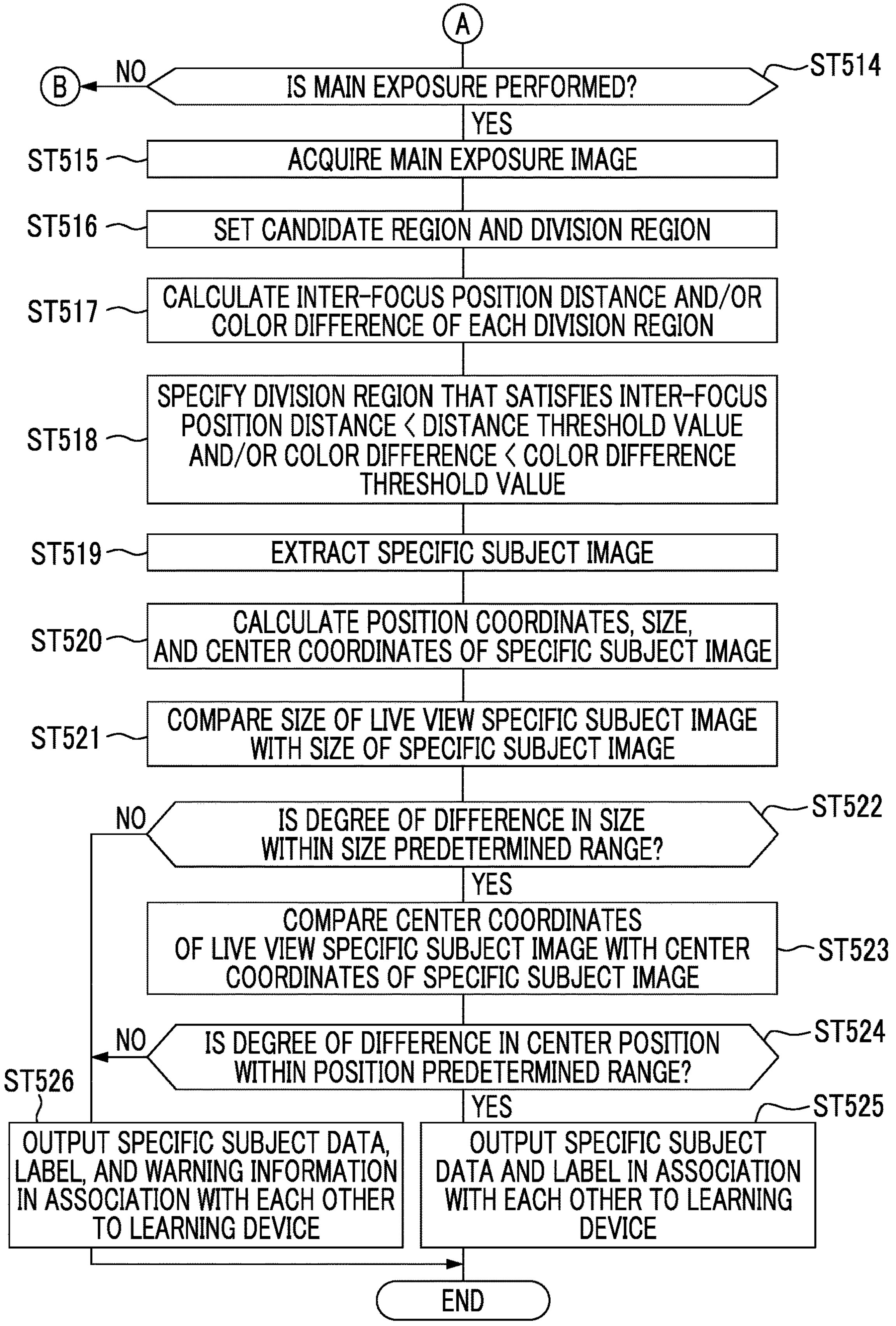

ST514 IS MAIN EXPOSURE PERFORMED? (NO → B; YES)

ST515 ACQUIRE MAIN EXPOSURE IMAGE

ST516 SET CANDIDATE REGION AND DIVISION REGION

ST517 CALCULATE INTER-FOCUS POSITION DISTANCE AND/OR COLOR DIFFERENCE OF EACH DIVISION REGION

ST518 SPECIFY DIVISION REGION THAT SATISFIES INTER-FOCUS POSITION DISTANCE < DISTANCE THRESHOLD VALUE AND/OR COLOR DIFFERENCE < COLOR DIFFERENCE THRESHOLD VALUE

ST519 EXTRACT SPECIFIC SUBJECT IMAGE

ST520 CALCULATE POSITION COORDINATES, SIZE, AND CENTER COORDINATES OF SPECIFIC SUBJECT IMAGE

ST521 COMPARE SIZE OF LIVE VIEW SPECIFIC SUBJECT IMAGE WITH SIZE OF SPECIFIC SUBJECT IMAGE

ST522 IS DEGREE OF DIFFERENCE IN SIZE WITHIN SIZE PREDETERMINED RANGE? (NO → ST526; YES)

ST523 COMPARE CENTER COORDINATES OF LIVE VIEW SPECIFIC SUBJECT IMAGE WITH CENTER COORDINATES OF SPECIFIC SUBJECT IMAGE

ST524 IS DEGREE OF DIFFERENCE IN CENTER POSITION WITHIN POSITION PREDETERMINED RANGE? (NO → ST526; YES → ST525)

ST526 OUTPUT SPECIFIC SUBJECT DATA, LABEL, AND WARNING INFORMATION IN ASSOCIATION WITH EACH OTHER TO LEARNING DEVICE

ST525 OUTPUT SPECIFIC SUBJECT DATA AND LABEL IN ASSOCIATION WITH EACH OTHER TO LEARNING DEVICE

END

IMAGE SENSOR
24
P1
P2
P3
P4
P5
(FRONT-FOCUS IMAGE)
(FOCUS IMAGE)
(REAR-FOCUS IMAGE)
P3
$Q_1 = (X_1, Y_1)$
$Q_2 = (X_2, Y_2)$
S

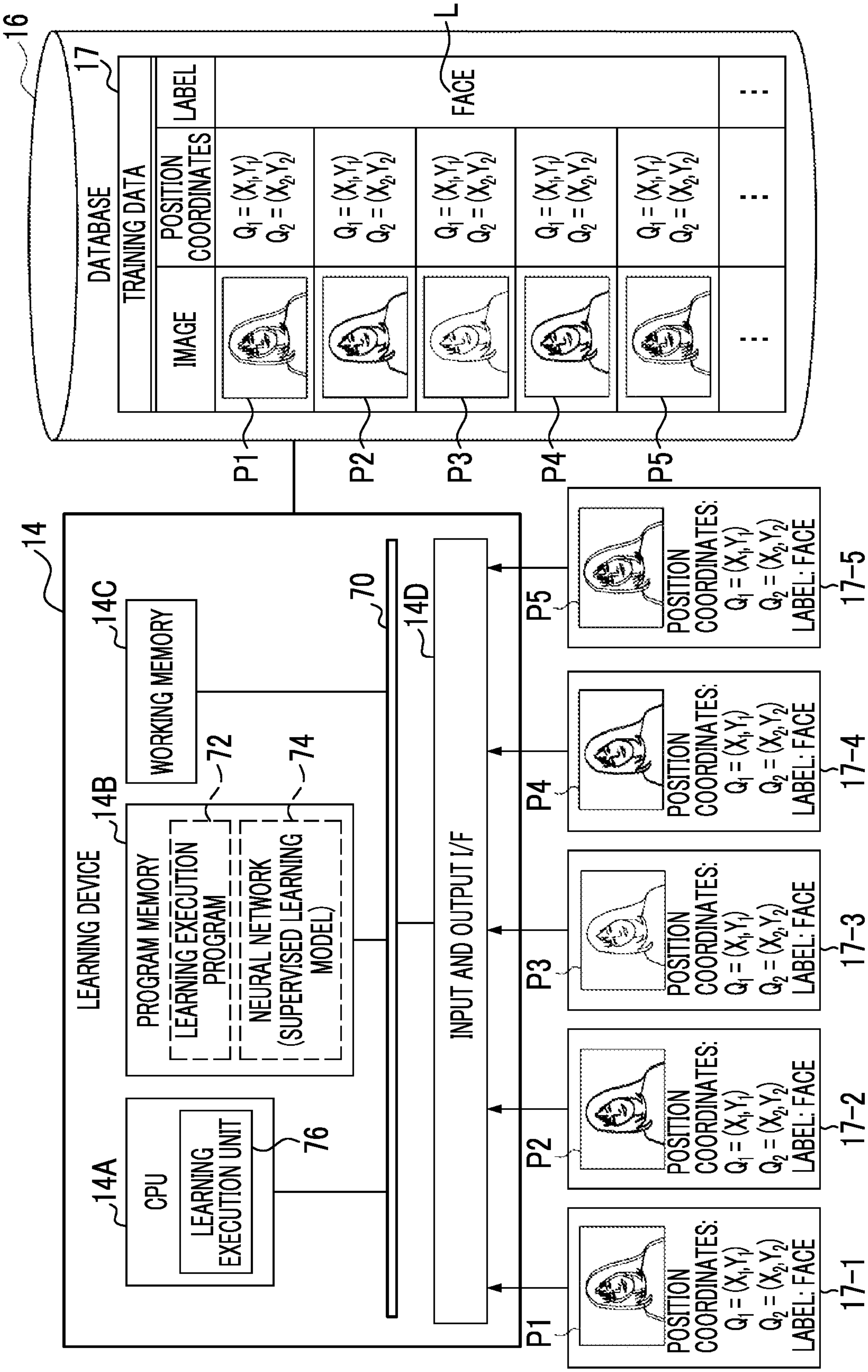

FIG. 24

14
LEARNING DEVICE
14A
CPU
LEARNING EXECUTION UNIT
76
14B
PROGRAM MEMORY
LEARNING EXECUTION PROGRAM
72
NEURAL NETWORK (SUPERVISED LEARNING MODEL)
74
14C
WORKING MEMORY
70
14D
INPUT AND OUTPUT I/F

16
DATABASE
17
TRAINING DATA

| IMAGE | POSITION COORDINATES | LABEL |
|---|---|---|
| P1 | $Q_1 = (X_1, Y_1)$ $Q_2 = (X_2, Y_2)$ | FACE |
| P2 | $Q_1 = (X_1, Y_1)$ $Q_2 = (X_2, Y_2)$ | |
| P3 | $Q_1 = (X_1, Y_1)$ $Q_2 = (X_2, Y_2)$ | |
| P4 | $Q_1 = (X_1, Y_1)$ $Q_2 = (X_2, Y_2)$ | |
| P5 | $Q_1 = (X_1, Y_1)$ $Q_2 = (X_2, Y_2)$ | |
| ... | ... | ... |

L

P1 POSITION COORDINATES: $Q_1 = (X_1, Y_1)$ $Q_2 = (X_2, Y_2)$ LABEL: FACE 17-1
P2 POSITION COORDINATES: $Q_1 = (X_1, Y_1)$ $Q_2 = (X_2, Y_2)$ LABEL: FACE 17-2
P3 POSITION COORDINATES: $Q_1 = (X_1, Y_1)$ $Q_2 = (X_2, Y_2)$ LABEL: FACE 17-3
P4 POSITION COORDINATES: $Q_1 = (X_1, Y_1)$ $Q_2 = (X_2, Y_2)$ LABEL: FACE 17-4
P5 POSITION COORDINATES: $Q_1 = (X_1, Y_1)$ $Q_2 = (X_2, Y_2)$ LABEL: FACE 17-5

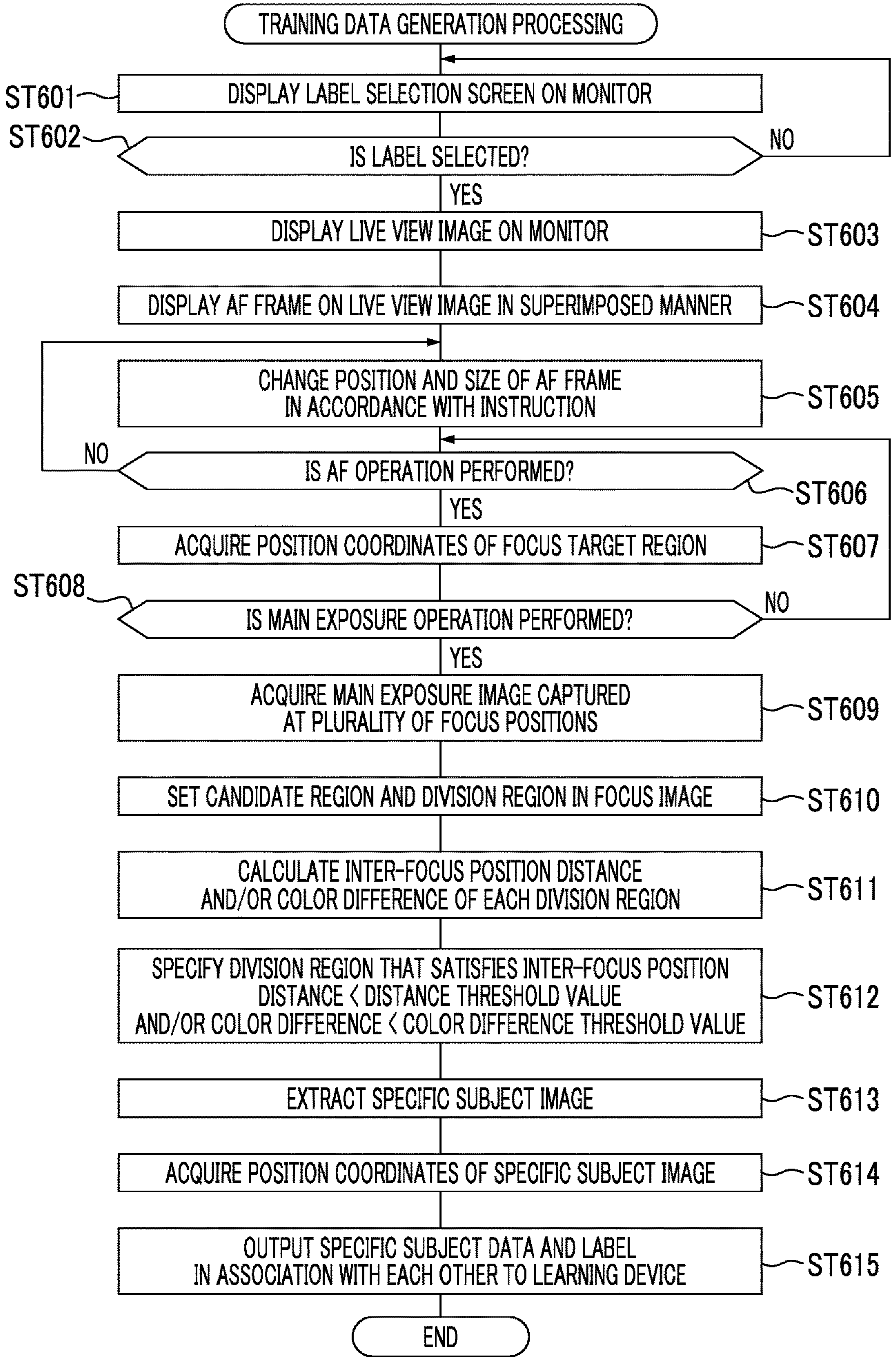

FIG. 25

TRAINING DATA GENERATION PROCESSING

ST601 DISPLAY LABEL SELECTION SCREEN ON MONITOR

ST602 IS LABEL SELECTED? (NO: return to ST601; YES: proceed)

ST603 DISPLAY LIVE VIEW IMAGE ON MONITOR

ST604 DISPLAY AF FRAME ON LIVE VIEW IMAGE IN SUPERIMPOSED MANNER

ST605 CHANGE POSITION AND SIZE OF AF FRAME IN ACCORDANCE WITH INSTRUCTION

ST606 IS AF OPERATION PERFORMED? (NO: return to ST605; YES: proceed)

ST607 ACQUIRE POSITION COORDINATES OF FOCUS TARGET REGION

ST608 IS MAIN EXPOSURE OPERATION PERFORMED? (NO: return to ST606; YES: proceed)

ST609 ACQUIRE MAIN EXPOSURE IMAGE CAPTURED AT PLURALITY OF FOCUS POSITIONS

ST610 SET CANDIDATE REGION AND DIVISION REGION IN FOCUS IMAGE

ST611 CALCULATE INTER-FOCUS POSITION DISTANCE AND/OR COLOR DIFFERENCE OF EACH DIVISION REGION

ST612 SPECIFY DIVISION REGION THAT SATISFIES INTER-FOCUS POSITION DISTANCE $<$ DISTANCE THRESHOLD VALUE AND/OR COLOR DIFFERENCE $<$ COLOR DIFFERENCE THRESHOLD VALUE

ST613 EXTRACT SPECIFIC SUBJECT IMAGE

ST614 ACQUIRE POSITION COORDINATES OF SPECIFIC SUBJECT IMAGE

ST615 OUTPUT SPECIFIC SUBJECT DATA AND LABEL IN ASSOCIATION WITH EACH OTHER TO LEARNING DEVICE

END

INFORMATION PROCESSING APPARATUS, LEARNING DEVICE, IMAGING APPARATUS, CONTROL METHOD OF INFORMATION PROCESSING APPARATUS, AND PROGRAM

CROSS-REFERENCE TO RELATED APPLICATIONS

This application is a continuation application of International Application No. PCT/JP2021/021754, filed Jun. 8, 2021, the disclosure of which is incorporated herein by reference in its entirety. Further, this application claims priority under 35 USC 119 from Japanese Patent Application No. 2020-113522 filed Jun. 30, 2020, the disclosure of which is incorporated by reference herein.

BACKGROUND

1. Technical Field

The technology of the present disclosure relates to an information processing apparatus, a learning device, an imaging apparatus, a control method of an information processing apparatus, and a program.

2. Related Art

WO2008/133237A discloses an imaging apparatus that images an object space. The imaging apparatus comprises a subject feature point learning unit, a subject feature point learning information storage unit, an imaging candidate image information acquisition unit, an image search processing unit, and an imaging condition adjustment unit. The subject feature point learning unit detects an image of a predetermined subject from image information obtained by imaging the object space, and extracts subject feature point learning information indicating a feature point of the image of the subject. The subject feature point learning information storage unit stores the subject feature point learning information. The imaging candidate image information acquisition unit acquires imaging candidate images which are images that are candidates for imaging. The image search processing unit determines whether or not information indicating a feature point that matches the feature point indicated by the subject feature point learning information stored in advance in the subject feature point learning information storage unit is included in imaging candidate image feature point information indicating the feature points included in an image of at least one subject included in the imaging candidate images, from the acquired imaging candidate images. As a result of determination, in a case in which the information indicating the feature point that matches the feature point indicated by the subject feature point learning information is included in the imaging candidate image feature point information, the imaging condition adjustment unit gives an instruction to an imaging condition optimization unit that performs optimization of an imaging condition to perform the optimization of the imaging condition with respect to the subject corresponding to the imaging candidate image feature point information in the imaging candidate images.

JP2013-80428A discloses a program causing a computer to execute an acquisition step of acquiring first learning data adapted by a first device by learning, and a data conversion step of, based on a data format of second learning data adapted by a second device by learning, converting the acquired first learning data into learning data of a data format suitable for the data format of the second learning data.

SUMMARY

One embodiment according to the technology of the present disclosure provides an information processing apparatus that can more easily collect data used in machine learning than in a case in which a specific subject image used in machine learning is manually selected from a captured image obtained by imaging with an image sensor.

A first aspect according to the technology of the present disclosure relates to an information processing apparatus comprising a processor, and a memory connected to or built in the processor, in which, in a case in which imaging accompanied by a focus operation in which a specific subject is used as a focus target region is performed by an image sensor, the processor outputs specific subject data related to a specific subject image indicating the specific subject in a captured image obtained by the imaging as data used in machine learning.

A second aspect according to the technology of the present disclosure relates to the information processing apparatus according to the first aspect, in which the machine learning is supervised machine learning, and the processor gives a label, which is information related to the specific subject image, to the specific subject data, and outputs the specific subject data as training data used in the supervised machine learning.

A third aspect according to the technology of the present disclosure relates to the information processing apparatus according to the first or second aspect, in which the processor displays the focus target region in an aspect that is distinguishable from other image regions in a state in which a video for display based on a signal output from the image sensor is displayed on a monitor, and the specific subject image is an image corresponding to a position of the focus target region in the captured image.

A fourth aspect according to the technology of the present disclosure relates to the information processing apparatus according to the third aspect, in which the processor displays the focus target region in the aspect that is distinguishable from the other image regions by displaying a frame that surrounds the focus target region in the video for display.

A fifth aspect according to the technology of the present disclosure relates to the information processing apparatus according to the fourth aspect, in which a position of the frame is changeable in accordance with a given position change instruction.

A sixth aspect according to the technology of the present disclosure relates to the information processing apparatus according to the fourth or fifth aspect, in which a size of the frame is changeable in accordance with a given size change instruction.

A seventh aspect according to the technology of the present disclosure relates to the information processing apparatus according to any one of the first to sixth aspects, in which the processor outputs the captured image and coordinates of the focus target region as the data used in the machine learning.

An eighth aspect according to the technology of the present disclosure relates to the information processing apparatus according to the first or second aspect, in which the processor displays a video for display based on a signal output from the image sensor on a monitor, receives designation of the focus target region in the video for display, and extracts the specific subject image based on a region of which a similarity evaluation value indicating a degree of similarity to the focus target region is within a first predetermined range in a predetermined region including the focus target region.

A ninth aspect according to the technology of the present disclosure relates to the information processing apparatus according to the eighth aspect, in which the processor displays the focus target region in an aspect that is distinguishable from other image regions.

A tenth aspect according to the technology of the present disclosure relates to the information processing apparatus according to the eighth or ninth aspect, in which at least one of the focus target region or the specific subject image is determined in units of division regions obtained by dividing the predetermined region.

An eleventh aspect according to the technology of the present disclosure relates to the information processing apparatus according to any one of the eighth to tenth aspects, in which the similarity evaluation value is a value based on a focus evaluation value used in the focus operation.

A twelfth aspect according to the technology of the present disclosure relates to the information processing apparatus according to any one of the eighth to eleventh aspects, in which the similarity evaluation value is a color evaluation value based on color information of the predetermined region.

A thirteenth aspect according to the technology of the present disclosure relates to the information processing apparatus according to any one of the eighth to twelfth aspects, in which the processor performs abnormality detection processing in a case in which a degree of difference between a specific subject image for display indicating the specific subject in the video for display and the specific subject image exceeds a second predetermined range, and the specific subject image for display is determined based on the similarity evaluation value.

A fourteenth aspect according to the technology of the present disclosure relates to the information processing apparatus according to any one of the first to thirteenth aspects, in which the specific subject data includes coordinates of the specific subject image, and the processor outputs the captured image and the coordinates of the specific subject image as the data used in the machine learning.

A fifteenth aspect according to the technology of the present disclosure relates to the information processing apparatus according to any one of the first to fourteenth aspects, in which the specific subject data is the specific subject image cut out from the captured image, and the processor outputs the cut out specific subject image as the data used in the machine learning.

A sixteenth aspect according to the technology of the present disclosure relates to the information processing apparatus according to any one of the first to fifteenth aspects, in which the processor stores the data in the memory, and performs the machine learning using the data stored in the memory.

A seventeenth aspect according to the technology of the present disclosure relates to a learning device comprising a reception device that receives the data output from the information processing apparatus according to any one of the first to fifteenth aspects, and an operation device that performs the machine learning using the data received by the reception device.

An eighteenth aspect according to the technology of the present disclosure relates to an imaging apparatus comprising the information processing apparatus according to any one of the first to sixteenth aspects, and the image sensor.

A nineteenth aspect according to the technology of the present disclosure relates to the imaging apparatus according to the eighteenth aspect, in which the image sensor performs the imaging at a plurality of focus positions, and for a plurality of the captured images obtained by performing the imaging, the processor outputs coordinates of the specific subject image obtained from a focus image in which the specific subject is in focus as coordinates of the specific subject image in an out-of-focus image in which the specific subject is out of focus.

A twentieth aspect according to the technology of the present disclosure relates to a control method of an information processing apparatus, the method comprising outputting, in a case in which imaging accompanied by a focus operation in which a specific subject is used as a focus target region is performed by an image sensor, specific subject data related to a specific subject image indicating the specific subject in a captured image obtained by the imaging as data used in machine learning.

A twenty-first aspect according to the technology of the present disclosure relates to a program causing a computer to execute a process comprising outputting, in a case in which imaging accompanied by a focus operation in which a specific subject is used as a focus target region is performed by an image sensor, specific subject data related to a specific subject image indicating the specific subject in a captured image obtained by the imaging as data used in machine learning.

BRIEF DESCRIPTION OF THE DRAWINGS

Exemplary embodiments of the technology of the disclosure will be described in detail based on the following figures, wherein:

FIG. 22B is a continuation of the flowchart shown in FIG. 22A;

FIG. 24 is an explanatory diagram showing an example of an aspect in which the training data output from the information processing apparatus according to the sixth embodiment is stored in the database;

FIG. 25 is a flowchart showing an example of a flow of the training data generation processing performed by the information processing apparatus according to the sixth embodiment;

DETAILED DESCRIPTION

In the following, an example of an embodiment of an imaging apparatus and an operation method of an imaging apparatus according to the technology of the present disclosure will be described in accordance with reference to accompanying drawings.

First, the terms used in the following description will be described.

CPU refers to an abbreviation of "Central Processing Unit". RAM refers to an abbreviation of "Random Access Memory". NVM refers to an abbreviation of "Non-Volatile Memory". IC refers to an abbreviation of "Integrated Circuit". ASIC refers to an abbreviation of "Application Specific Integrated Circuit". PLD refers to an abbreviation of "Programmable Logic Device". FPGA refers to an abbreviation of "Field-Programmable Gate Array". SoC refers to an abbreviation of "System-on-a-chip". SSD refers to an abbreviation of "Solid State Drive". USB refers to an abbreviation of "Universal Serial Bus". HDD refers to an abbreviation of "Hard Disk Drive". EEPROM refers to an abbreviation of "Electrically Erasable and Programmable Read Only Memory". EL refers to an abbreviation of "Electro-Luminescence". I/F refers to an abbreviation of "Interface". UI refers to an abbreviation of "User Interface". TOF refers to an abbreviation of "Time of Flight". fps refers to an abbreviation of "frame per second". MF refers to an abbreviation of "Manual Focus". AF refers to an abbreviation of "Auto Focus". In the following, for convenience of description, a CPU is described as an example of a "processor" according to the technology of the present disclosure. However, the "processor" according to the technology of the present disclosure may be a combination of a plurality of processing devices, such as the CPU and a GPU. In a case in which the combination of the CPU and the GPU is applied as an example of the "processor" according to the technology of the present disclosure, the GPU is operated under the control of the CPU and is responsible for executing the image processing.

In the description of the present specification, "vertical" refers to the verticality in the sense of including an error generally allowed in the technical field to which the technology of the present disclosure belongs, in addition to the exact verticality.

In the following description, in a case in which the expression of "image" is used instead of "image data" other than "image" displayed on a monitor, the "image" also includes the meaning of "data indicating an image (image data)". In the present specification, a "subject in the image" means a subject included as an image in the image.

First Embodiment

Figure 1:
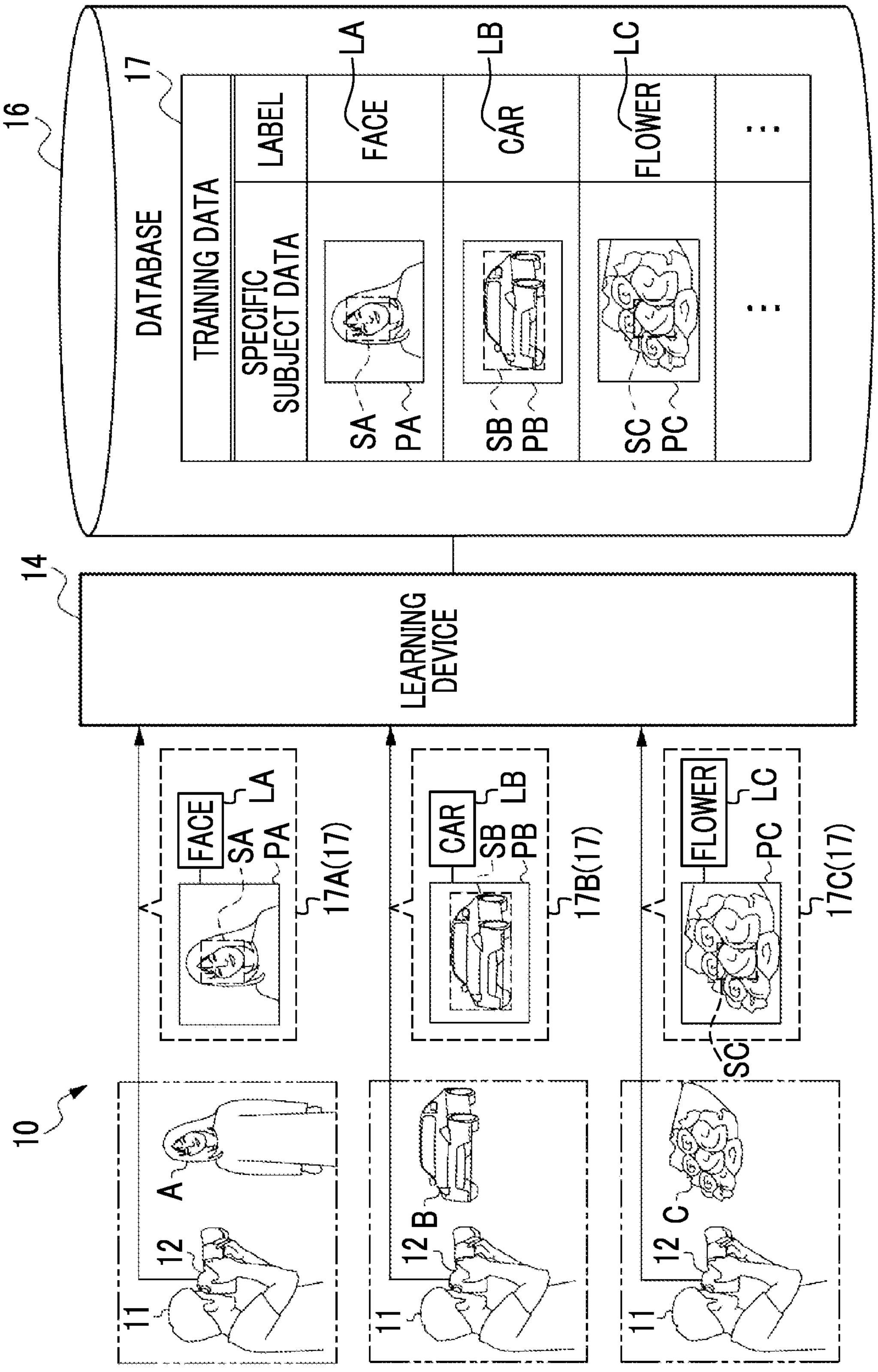
FIG. 1 is a schematic view showing an example of a training data generation system.

As an example, as shown in FIG. 1, a training data generation system 10 comprises an imaging apparatus 12, a learning device 14, and a database 16 connected to the learning device 14.

The imaging apparatus 12 is a digital camera, for example. The imaging apparatus 12 is communicably connected to the learning device 14 via a communication network, such as the Internet. The imaging apparatus 12 has a normal imaging mode and a training data imaging mode, as an operation mode of an imaging system. In the normal imaging mode, the imaging apparatus 12 operates a mechanical shutter 48 (see FIG. 4) to store an image (hereinafter, also referred to as a "main exposure image") imaged on a light-receiving surface 24A (see FIG. 4) of the image sensor 24 in a memory. In the training data imaging mode, the imaging apparatus 12 outputs data related to an image indicating a specific subject in the main exposure image (hereinafter, referred to as a "specific subject image") to the learning device 14 as data used in machine learning. In the following, the data related to the specific subject image is also referred to as "specific subject data". It should be noted that the machine learning includes, for example, deep learning and a convolutional neural network.

The learning device 14 is a computer, for example. The database 16 comprises a storage, such as an HDD or an EEPROM, and stores the data received by the learning device 14.

The data used in the machine learning is, for example, training data used for constructing a model in the machine learning. In the present embodiment, the training data is labeled image data including the specific subject data and a label which is information related to the specific subject image. The learning device 14 constructs a class classification model that classifies classes of the subject reflected in the image by performing supervised machine learning using the training data.

In the example shown in FIG. 1, a user 11 of the imaging apparatus 12 (hereinafter, simply referred to as "user 11") sets the imaging apparatus 12 in the training data imaging mode and sequentially images specific subjects A, B, and C. Before imaging the specific subject A, the user 11 selects a label LA indicating a "face" via a reception unit 60 (see FIG. 4) in the imaging apparatus 12. The imaging apparatus 12 outputs the specific subject data related to a specific subject image SA in a main exposure image PA obtained by imaging the specific subject A, and the label LA in association with each other to the learning device 14 as training data 17A. The learning device 14 receives the training data 17A, and stores the specific subject data related to the specific subject image SA and the label LA in association with each other in the database 16.

Similarly, before imaging the specific subject B, the user 11 selects a label LB indicating a "car" via the reception unit 60 (see FIG. 4) in the imaging apparatus 12. The imaging apparatus 12 outputs the specific subject data related to a specific subject image SB in a main exposure image PB obtained by imaging the specific subject B, and the label LB in association with each other to the learning device 14 as training data 17B. The learning device 14 receives the training data 17B, and stores the specific subject data related to the specific subject image SB and the label LB in association with each other in the database 16.

In addition, before imaging the specific subject C, the user 11 selects a label LC indicating a "flower" via the reception unit 60 (see FIG. 4) in the imaging apparatus 12. The imaging apparatus 12 outputs the specific subject data related to a specific subject image SC in a main exposure image PC obtained by imaging the specific subject C, and the label LC in association with each other to the learning device 14 as training data 17C. The learning device 14 receives the training data 17C, and stores the specific subject data related to the specific subject image SC and the label LC in association with each other in the database 16.

Here, the main exposure images PA, PB, and PC are examples of a "captured image" according to the technology of the present disclosure. The specific subjects A, B, and C are examples of a "specific subject" according to the technology of the present disclosure. The specific subject images SA, SB, and SC are examples of a "specific subject image" according to the technology of the present disclosure. The specific subject data is an example of "specific subject data" according to the technology of the present disclosure. It should be noted that, in the following description, in a case in which the distinction is not needed, the main exposure images PA, PB, and PC are collectively referred to as a "main exposure image P". In addition, in the following description, in a case in which the distinction is not needed, the specific subjects A, B, and C are referred to as a "specific subject" without designating the reference numeral. In addition, in the following description, in a case in which the distinction is not needed, the specific subject images SA, SB, and SC are collectively referred to as a "specific subject image S".

The labels LA, LB, and LC are examples of a "label" according to the technology of the present disclosure. The training data 17A, 17B, and 17C are examples of "data" and "training data" according to the technology of the present disclosure. It should be noted that, in the following description, in a case in which the distinction is not needed, the labels LA, LB, and LC are collectively referred to as a "label L". In addition, in the following description, in a case in which the distinction is not needed, the training data 17A, 17B, and 17C are collectively referred to as "training data 17".

Figure 2:
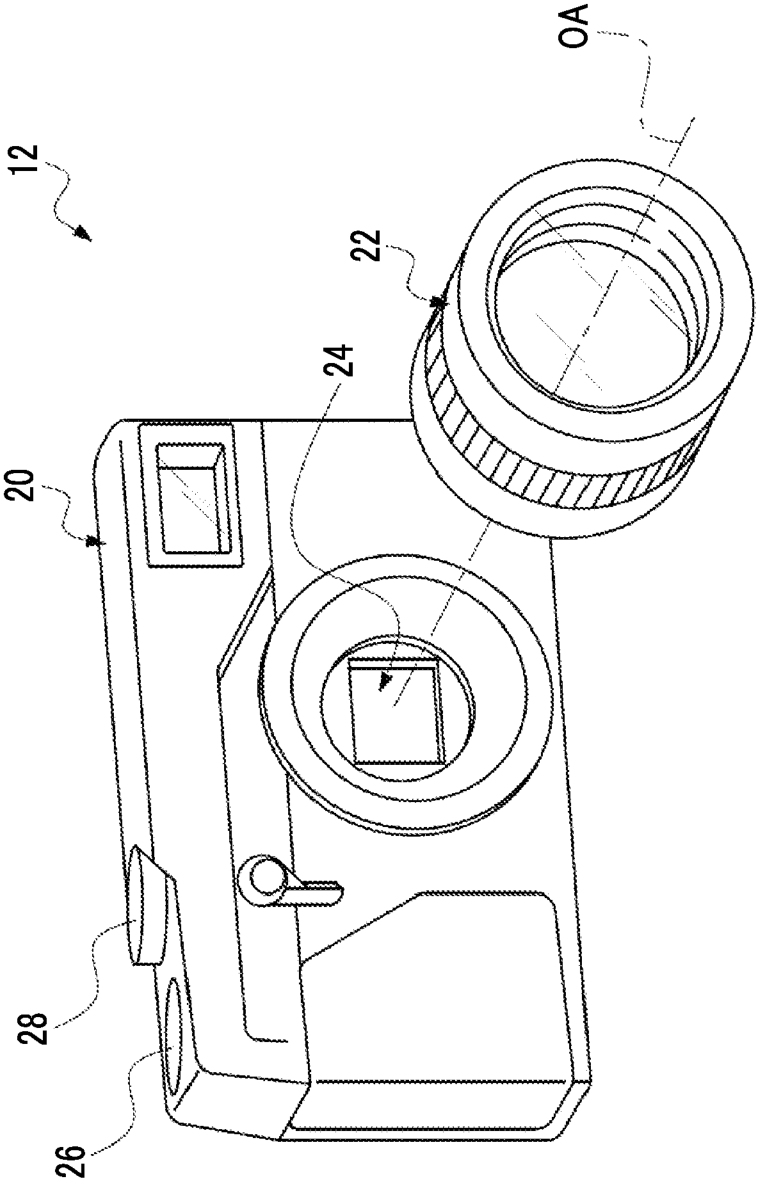
FIG. 2 is a perspective view showing an example of an appearance of a front side of an imaging apparatus.

As an example, as shown in FIG. 2, an imaging apparatus 12 is a digital camera having an interchangeable lens and omitting a reflex mirror. The imaging apparatus 12 comprises an imaging apparatus body 20 and an interchangeable lens 22 that is interchangeably mounted on the imaging apparatus body 20. It should be noted that, here, as an example of the imaging apparatus 12, the digital camera having the interchangeable lens and omitting the reflex mirror is described, but the technology of the present disclosure is not limited to this. A digital camera having a stationary lens may be used, a digital camera in which the reflex mirror is not omitted may be used, or a digital camera built in various electronic apparatuses, such as a smart device, a wearable terminal, a cell observation device, an ophthalmologic observation device, and a surgical microscope, may be used.

An image sensor 24 is provided in the imaging apparatus body 20. The image sensor 24 comprises a photoelectric conversion element 80 (see FIG. 14). The image sensor 24 has the light-receiving surface 24A (see FIG. 14). The image sensor 24 is disposed in the imaging apparatus body 20 such that the center of the light-receiving surface 24A and an optical axis OA match.

The image sensor 24 is a CMOS image sensor. In a case in which the interchangeable lens 22 is mounted on the imaging apparatus body 20, subject light indicating a subject is transmitted through the interchangeable lens 22 and imaged on the image sensor 24, so that image data indicating the image of the subject is generated by the image sensor 24. Here, the image sensor 24 is an example of an "image sensor" according to the technology of the present disclosure.

It should be noted that, in the present embodiment, the CMOS image sensor is described as the image sensor 24, but the technology of the present disclosure is not limited to this. For example, the technology of the present disclosure is established even in a case in which the image sensor 24 is another type of image sensor, such as a CCD image sensor.

A release button 26 and a dial 28 are provided on an upper surface of the imaging apparatus body 20. The dial 28 is operated in a case in which an operation mode of the imaging apparatus 12 is set. The operation mode of the imaging apparatus 12 includes the operation mode of the imaging system including the normal imaging mode and the training data imaging mode, and the operation mode of the playback system including the playback mode.

The release button 26 functions as an imaging preparation instruction unit and an imaging instruction unit, and a push operation of two stages of an imaging preparation instruction state and an imaging instruction state can be detected. For example, the imaging preparation instruction state refers to a state in which the release button 18 is pushed to an intermediate position (half push position) from a standby position, and the imaging instruction state refers to a state in which the release button 18 is pushed to a final push position (full push position) beyond the intermediate position. It should be noted that, in the following, the "state in which the release button 18 is pushed to the half push position from the standby position" will be referred to as a "half push state", and the "state in which the release button 18 is pushed to the full push position from the standby position" will be referred to as a "full push state". In addition, in the following, an operation in which the release button 26 is pushed to the final push position (full push position) is also referred to as a "main exposure operation". It should be noted that the "main exposure operation" may be performed by another method, for example, a touch panel monitor 3 described below is touched.

Figure 3:
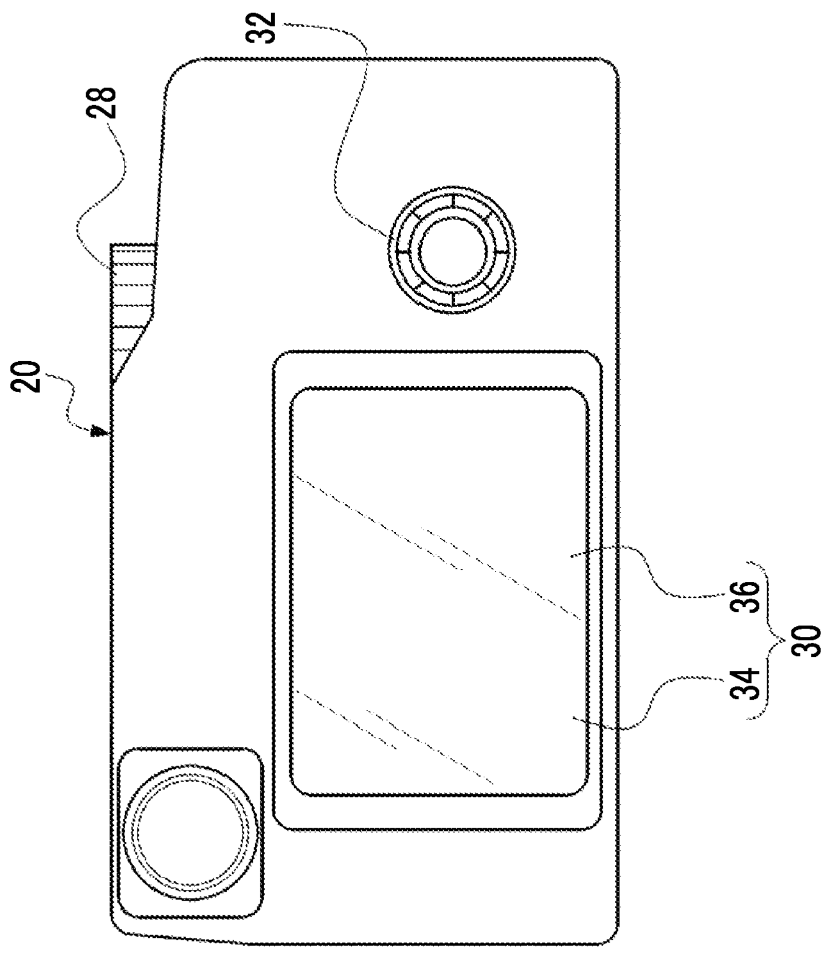
FIG. 3 is a rear view showing an example of an appearance of a rear side of the imaging apparatus.

As an example, as shown in FIG. 3, a touch panel monitor 30 and an instruction key 32 are provided on a rear surface of the imaging apparatus body 20.

Figure 4:
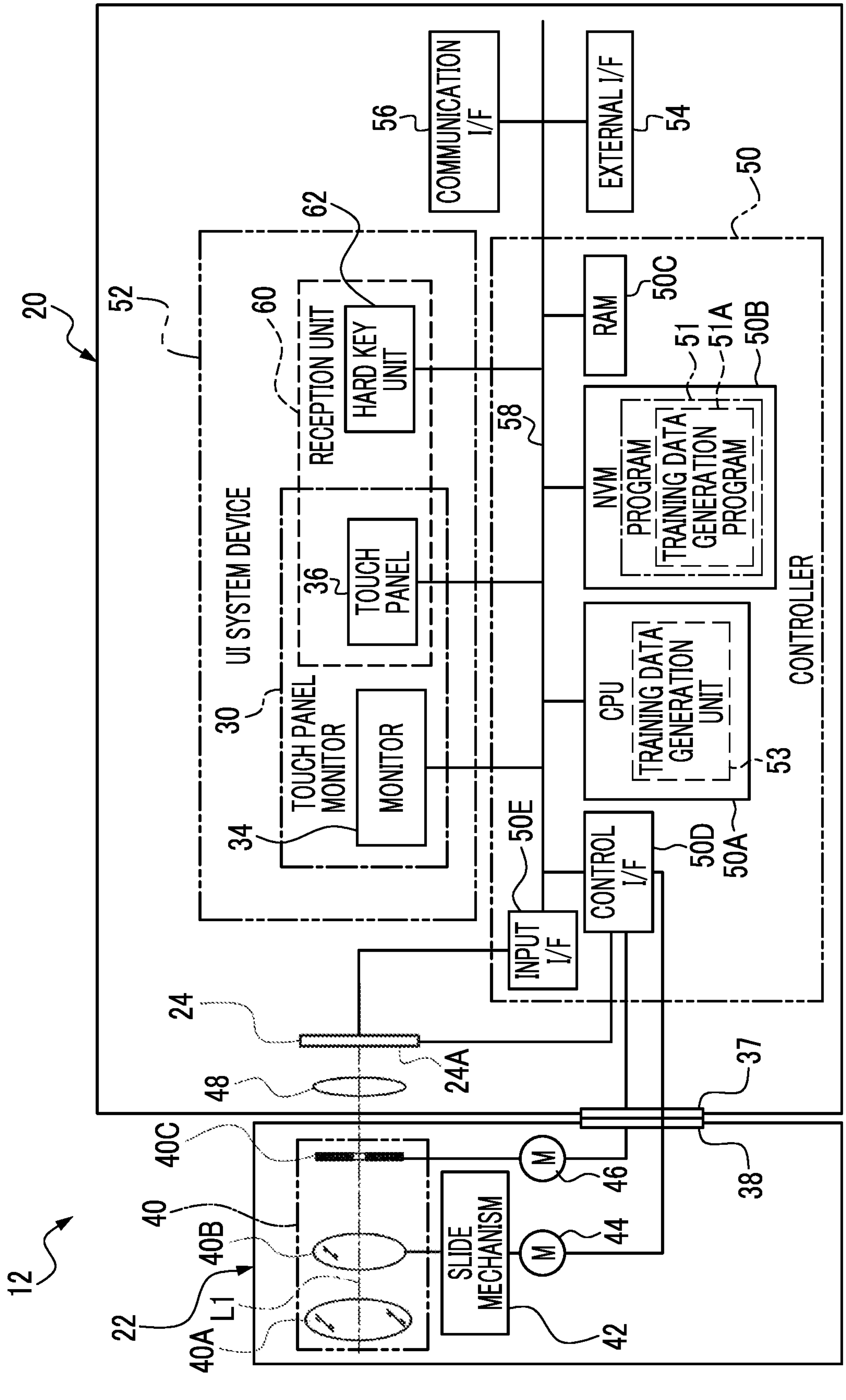
FIG. 4 is a block diagram of the imaging apparatus.

The touch panel monitor 30 comprises a monitor 34 and a touch panel 36 (see also FIG. 4). Examples of the monitor 34 include an organic EL display. The monitor 34 does not have to be the organic EL display, and another type of display, such as an inorganic EL display and a liquid crystal display, may be used. It should be noted that the monitor 34 is an example of a "monitor" according to the technology of the present disclosure.

The monitor 34 displays an image and/or text information. The monitor 34 is used for imaging for the live view image, that is, for displaying the live view image obtained by performing the continuous imaging in a case in which the imaging apparatus 12 is in the operation mode of the imaging system. The imaging for the live view image (hereinafter, also referred to as "imaging for the live view image") is performed in accordance with, for example, a frame rate of 60 fps. It should be noted that the frame rate of the imaging for the live view image is not limited to 60 fps, and may be higher than or lower than 60 fps.

Here, the live view image refers to a video for display based on the image data obtained by the imaging performed by the image sensor 24. Here, the live view image is an example of a "video for display" according to the technology of the present disclosure. Generally, the live view image is also referred to as a live preview image. In addition, the monitor 34 is also used for displaying the main exposure image P. Further, the monitor 34 is also used for displaying a playback image and displaying a menu screen and the like in a case in which the imaging apparatus 12 is in the playback mode.

The touch panel 36 is a transmissive touch panel, and is superimposed on a surface of a display region of the monitor 34. The touch panel 36 receives an instruction from the user 11 by detecting a contact of an indicator, such as a finger or a stylus pen.

It should be noted that, in the present embodiment, examples of the touch panel monitor 30 include an out-cell type touch panel display in which the touch panel 36 is superimposed on the surface of the display region of the monitor 34, but this is merely an example. For example, the on-cell type or in-cell type touch panel display can be applied as the touch panel monitor 30.

The instruction key 32 receives various instructions. Here, the "various instructions" refers to various instructions, for example, an instruction for displaying a menu screen on which various menus can be selected, an instruction for selecting one or a plurality of menus, an instruction for confirming a selected content, an instruction for deleting the selected content, zooming in, zooming out, and frame advance. In addition, these instructions may be given by the touch panel 36.

As an example, as shown in FIG. 4, the imaging apparatus 12 comprises mounts 37 and 38. The mount 37 is provided in the imaging apparatus body 20. The mount 38 is provided in the interchangeable lens 22 at a position facing a position of the mount 37. The interchangeable lens 22 is interchangeably mounted on the imaging apparatus body 20 by bonding the mount 38 to the mount 37.

As an example, as shown in FIG. 4, the imaging lens 40 comprises an objective lens 40A, a focus lens 40B, and a stop 40C. The objective lens 40A, the focus lens 40B, and the stop 40C are disposed in an order of the objective lens 40A, the focus lens 40B, and the stop 40C along the optical axis OA from the subject side (object side) to the imaging apparatus body 20 side (image side).

In addition, the interchangeable lens 22 comprises a slide mechanism 42 and motors 44 and 46. The focus lens 40B is attached to the slide mechanism 42 in a slidable manner along the optical axis OA. In addition, the motor 44 is connected to the slide mechanism 42, and the slide mechanism 42 moves the focus lens 40B along the optical axis OA by receiving power of the motor 44 to operate.

The stop 40C is a stop with an aperture having a variable size. The motor 46 is connected to the stop 40C, and the stop 40C adjusts exposure by receiving the power of the motor 46 to operate. It should be noted that a structure and/or an operation method of the interchangeable lens 22 can be changed as needed.

The motors 44 and 46 are connected to the imaging apparatus body 20 via the mount 38, and driving of the motors 44 and 46 is controlled in accordance with a command from the imaging apparatus body 20. It should be noted that, in the present embodiment, stepping motors are adopted as an example of the motors 44 and 46. Therefore, the motors 44 and 46 operate in synchronization with a pulse signal in accordance with the command from the imaging apparatus body 20. In addition, in the example shown in FIG. 4, the example is described in which the motors 44 and 46 are provided in the interchangeable lens 22, but the technology of the present disclosure is not limited to this. One of the motors 44 and 46 may be provided in the imaging apparatus body 20, or both the motors 44 and 46 may be provided in the imaging apparatus body 20.

In a case of the normal imaging mode, the imaging apparatus 12 is selectively set in one of an MF mode and an AF mode in accordance with an instruction given to the imaging apparatus body 20. The MF mode is an operation mode for manually focusing. In the MF mode, for example, in a case in which a focus ring (not shown) of the interchangeable lens 22 is operated by the user 11, the focus lens 40B is moved along the optical axis OA with a movement amount corresponding to an operation amount of the focus ring to adjust the focus.

In the AF mode, the imaging apparatus body 20 calculates a focus position in accordance with the subject distance by putting the release button 26 into the half push state, and moves the focus lens 40B toward the calculated focus position to adjust the focus. Thereafter, by uninterruptedly putting the release button 26 into the full push state, the imaging apparatus body 20 performs a main exposure operation (described below). Here, the "focus position" refers to a position of the focus lens 40B on the optical axis OA in an in-focus state.

It should be noted that, in a case of the training data imaging mode, the imaging apparatus 12 is set in the AF mode. In the following, for convenience of description, the control of aligning the focus lens 40B with the focus position is also referred to as an "AF control". In addition, in the following, for convenience of description, the calculation of the focus position is also referred to as an "AF calculation".

The imaging apparatus body 20 comprises a mechanical shutter 48. The mechanical shutter 48 is a focal plane shutter and is disposed between the stop 40C and the light-receiving surface 24A. The mechanical shutter 48 is operated by receiving power from a drive source (not shown), such as a motor. The mechanical shutter 48 includes a light shielding mechanism (not shown) that shields the subject light that is transmitted through the imaging lens 40 and imaged on the light-receiving surface 24A of the image sensor 24. The imaging apparatus 12 performs the main exposure operation at a timing in which the mechanical shutter 48 opens and closes the light shielding mechanism. The main exposure operation refers to an operation of capturing the image data of the image (main exposure image P) formed on the light-receiving surface 24A and storing the image data in the memory. It should be noted that the main exposure operation is an example of "imaging" according to the technology of the present disclosure.

The imaging apparatus body 20 comprises a controller 50 and a UI system device 52. The controller 50 controls the entire imaging apparatus 12. The UI system device 52 is a device that presents the information to the user 11 or receives the instruction from the user 11. The UI system device 52 is connected to the controller 50 via a busline 58, and the controller 50 acquires various pieces of information from the UI system device 52 and controls the UI system device 52. It should be noted that the controller 50 is an example of an "information processing apparatus" according to the technology of the present disclosure.

The controller 50 comprises a CPU 50A, an NVM 50B, a RAM 50C, a control I/F 50D, and an input I/F 50E. The CPU 50A, the NVM 50B, the RAM 50C, the control I/F 50D, and the input I/F 50E are connected to each other via the busline 58.

The CPU 50A is an example of a "processor" according to the technology of the present disclosure. The CPU 50A controls the entire imaging apparatus 12. The NVM 50B is an example of a "memory" according to the technology of the present disclosure. Examples of the NVM 50B include an EEPROM. It should be noted that the EEPROM is merely an example. For example, a ferroelectric memory may be used instead of the EEPROM, and any memory may be used as long as it is a non-volatile memory that can be mounted on the imaging apparatus 12. The RAM 50C is a volatile memory used as a work area or the like in a case in which various programs are executed.

Various programs 51 are stored in the NVM 50B. The CPU 50A reads out a needed program 51 from the NVM 50B and executes the read out program 51 on the RAM 50C to collectively control the imaging apparatus 12.

The control I/F 50D is a device including an FPGA, and is connected to the image sensor 24. The CPU 50A controls the image sensor 24 via the control I/F 50D. In addition, the control I/F 50D is connected to the motors 44 and 46 via the mounts 37 and 38, and the CPU 50A controls the motors 44 and 46 via the control I/F 50D.

The input I/F 50E is connected to the image sensor 24. The input I/F 50E receives the image data output from the image sensor 24. The controller 50 generates the main exposure image data indicating the main exposure image P by performing known signal processing, such as white balance adjustment, sharpness adjustment, gamma correction, color space conversion processing, and color difference correction on the image data.

An external I/F 54 is connected to the busline 58. The external I/F 54 is a device including an FPGA. An external device (not shown), such as a USB memory or a memory card, is connected to the external I/F 54. The external I/F 54 controls the exchange of various pieces of information between the CPU 50A and the external device. The CPU 50A stores the main exposure image data in the external device via the external I/F 54.

In addition, the communication I/F 56 is connected to the busline 58. The communication I/F 56 is communicably connected to the learning device 14 via a communication network, such as the Internet. In the training data imaging mode, the CPU 50A outputs the training data 17 to the learning device 14 via the communication I/F 56.

The UI system device 52 comprises the touch panel monitor 30 and the reception unit 60. The monitor 34 and the touch panel 36 are connected to the busline 58. Therefore, the CPU 50A displays various pieces of information on the monitor 34 and is operated in accordance with various instructions received by the touch panel 36.

The reception unit 60 comprises the touch panel 36 and a hard key unit 62. The hard key unit 62 is a plurality of hard keys, and includes the release button 26, the dial 28, and the instruction key 32. The hard key unit 62 is connected to the busline 58, and the CPU 50A is operated in accordance with various instructions received by the hard key unit 62.

It should be noted that, in the example shown in FIG. 4, one bus is shown as the busline 58 for convenience of illustration, but a plurality of buses may be used. The busline 58 may be a serial bus, or may be a parallel bus, which includes a data bus, an address bus, a control bus, and the like.

A training data generation program 51A is included in the various programs 51 stored in the NVM 50B. In a case in which the imaging apparatus 12 is set in the training data imaging mode, the CPU 50A reads out the training data generation program 51A from the NVM 50B and executes the read out training data generation program 51A on the RAM 50C to be operated as a training data generation unit 53. The training data generation unit 53 executes training data generation processing. The training data generation processing performed by the training data generation unit 53 will be described in detail below.

Figure 5:
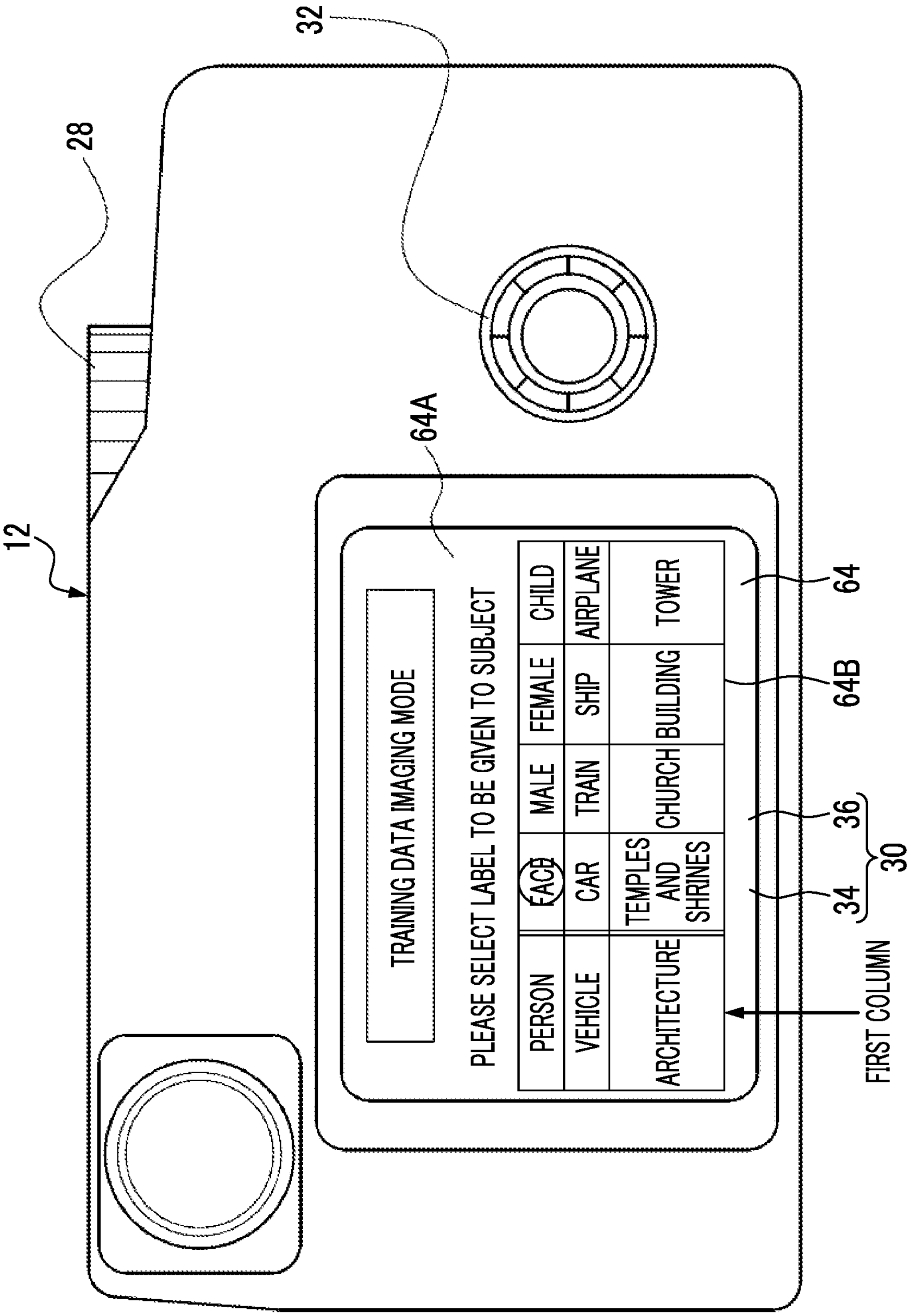
FIG. 5 is a rear view of the imaging apparatus showing an example of an aspect in which a label selection screen is displayed on a monitor in a case in which a training data imaging mode is selected.

As an example, as shown in FIG. 5, in the training data imaging mode, the training data generation unit 53 displays a label selection screen 64 on the touch panel monitor 30. On the label selection screen 64, a message 64A "Please select a label to be given to the subject" and a table 64B in which a plurality of label candidates are listed and displayed.

The label candidates (hereinafter, also referred to as "large label candidates") indicating relatively large attributes are displayed in a first column of the table 64B. The large label candidates are, for example, "person", "vehicle", and "architecture". In the other columns of the table 64B, label candidates (hereinafter, also referred to as "small label candidates") indicating attributes obtained by subdividing the large label candidates in the first column are displayed. For example, in a case in which the large label candidate is the "person", examples of the small label candidates include "face", "male", "female", and "child". The user 11 selects any label candidate from the table 64B by contacting with the touch panel 36 with the indicator.

In a case in which the specific subject A shown in FIG. 1 is imaged, as an example, as shown in FIG. 5, the user 11 selects the label of "face" from the label candidates listed in the table 64B via the touch panel monitor 30. It should be noted that the label candidates listed in FIG. 5 are examples, and the label candidates are not limited to these. In addition, a display method of the label candidate is not limited to this. In the example shown in FIG. 5, one small label candidate is selected, but the large label candidate may be selected, or a plurality of small label candidates may be selected.

The training data generation unit 53 receives the selected label L. The training data generation unit 53 stores the received label L in the RAM 50C.

Figure 6:
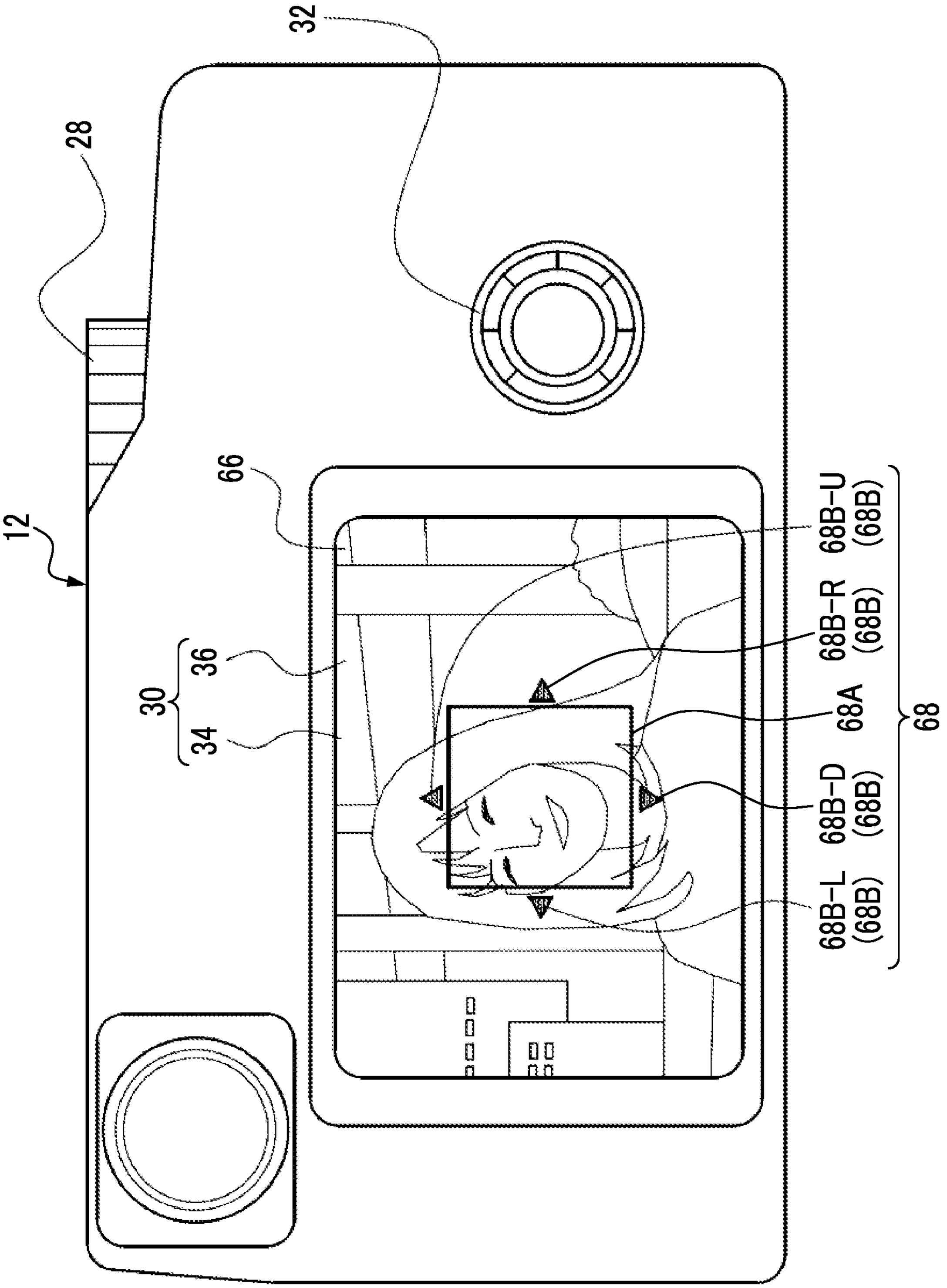
FIG. 6 is a rear view of the imaging apparatus showing an example of an aspect in which an AF frame is displayed on a live view image, which is displayed on the monitor, in a superimposed manner.

As an example, as shown in FIG. 6, after receiving the label L, the training data generation unit 53 displays a live view image 66 based on an imaging signal output from the image sensor 24 on the monitor 34. In addition, in the training data imaging mode, the training data generation unit 53 displays an AF frame 68 on the center of the monitor 34, on which the live view image 66 is displayed, in a superimposed manner. The AF frame 68 is a frame for displaying a region which is a focusing target (hereinafter, referred to as a "focus target region") on the live view image 66 so as to be distinguishable from other image regions in the AF mode. It should be noted that the AF frame 68 is an example of a "frame" according to the technology of the present disclosure. In addition, the focus target region is an example of a "focus target region" according to the technology of the present disclosure. In addition, the imaging signal is an example of a "signal" according to the technology of the present disclosure.

The AF frame 68 includes a rectangular frame line 68A and four triangular arrows 68B-U, 68B-D, 68B-R, and 68B-L disposed on four sides of the frame line 68A. In the following, in a case in which the distinction is not needed, the triangular arrows 68B-U, 68B-D, 68B-R, and 68B-L are collectively referred to as a "triangular arrow 68B".

By contacting with the triangular arrow 68B on the touch panel 36 with the indicator, the user 11 can give a position change instruction to the training data generation unit 53 to move the position of the AF frame 68 in the direction indicated by each triangular arrow 68B. The training data generation unit 53 changes the position of the AF frame 68 on the monitor 34 in accordance with the given position change instruction. Here, the position change instruction is an example of a "position change instruction" according to the technology of the present disclosure. It should be noted that the triangular arrow 68B displayed on the touch panel 36 is merely an example of a unit that receives the position change instruction from the user 11, and the unit thereof is not limited as long as the position change instruction from the user 11 can be received via the reception unit 60.

Figure 7:
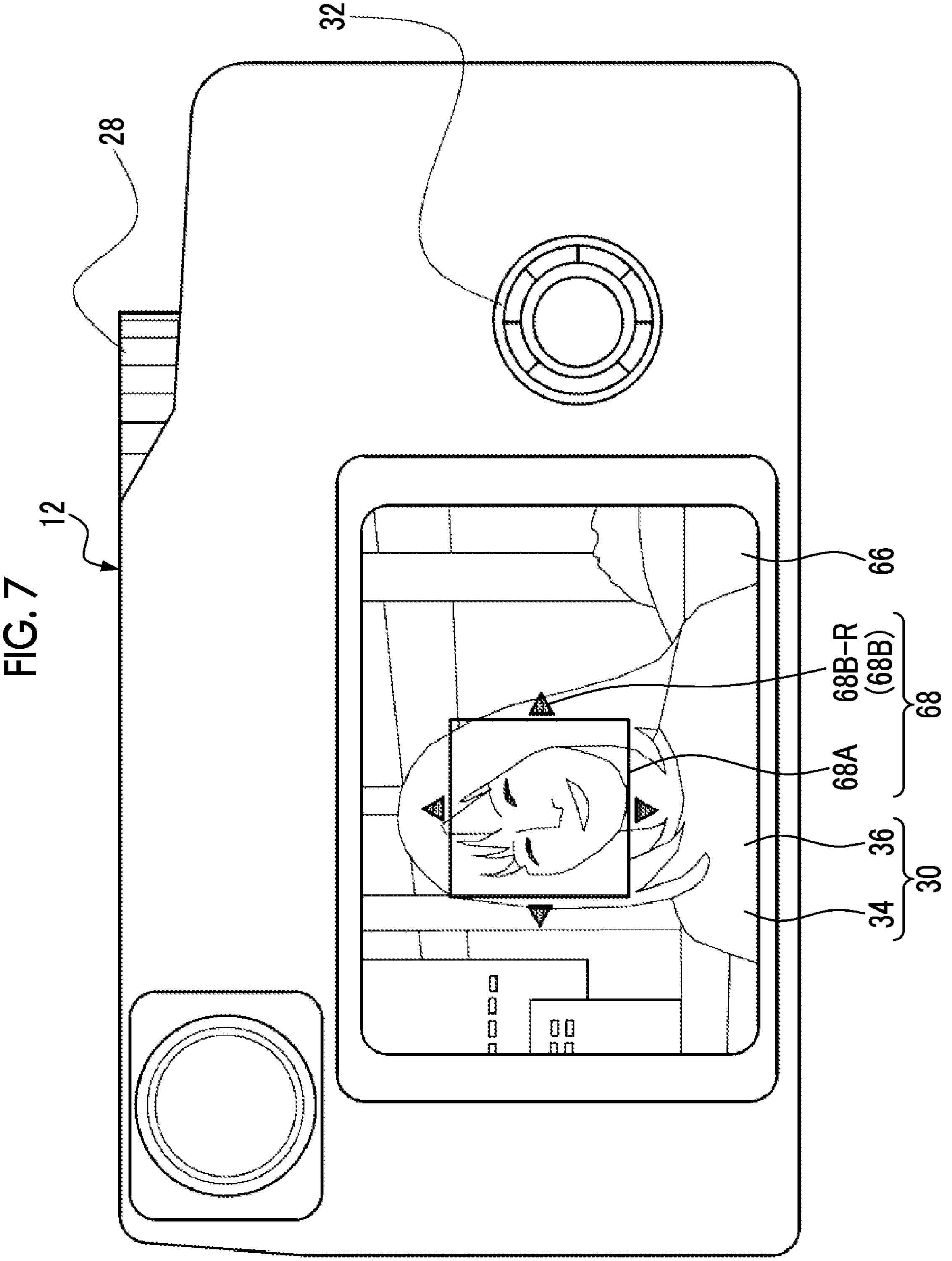
FIG. 7 is a rear view of the imaging apparatus showing an example of an aspect in which a position of the AF frame is changed in accordance with a position of a face of a subject.

For example, in FIG. 6, by contacting with the triangular arrows 68B-U and 68B-L on the touch panel 36 with the indicator, the user 11 gives the position change instruction to the training data generation unit 53 to move the AF frame 68 such that the frame line 68A surrounds the region indicating the face of the specific subject A. As a result, the AF frame 68 is moved to the position shown in FIG. 7, for example.

Figure 8:
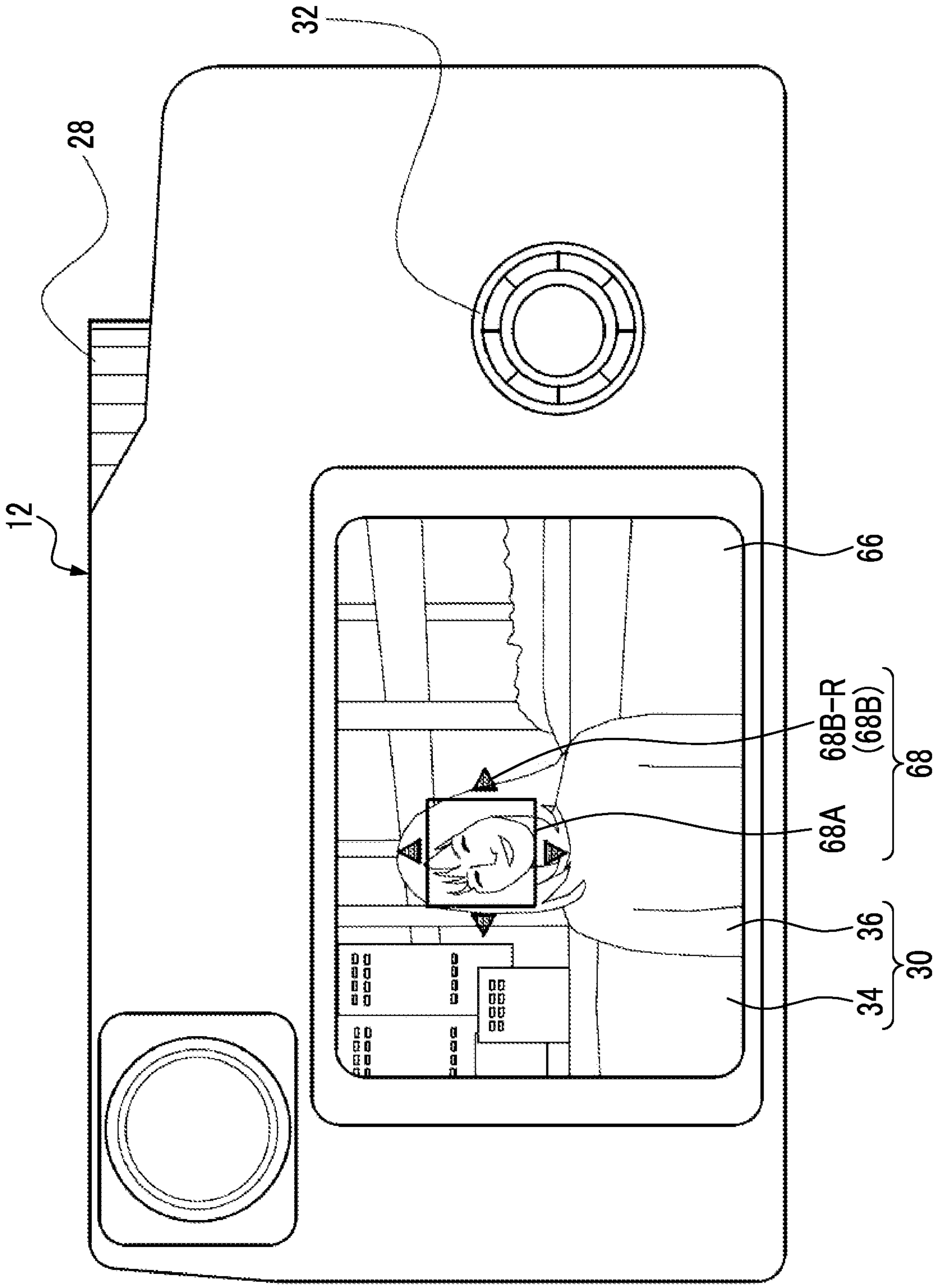
FIG. 8 is a rear view of the imaging apparatus showing an example of an aspect in which a size of the AF frame is changed in accordance with the position of the face of the subject.

In addition, by performing a pinch-in or pinch-out operation on the frame line 68A displayed on the touch panel monitor 30, the user 11 can give a size change instruction to the training data generation unit 53 to change the size of the frame line 68A. As an example, as shown in FIG. 8, in a case in which a zoom magnification of the imaging lens 40 is lower than that in the example shown in FIG. 7, the user 11 gives the size change instruction to the training data generation unit 53 to change the size of the frame line 68A to be small such that the frame line 68A surrounds the region indicating the face of the specific subject A. The training data generation unit 53 changes the size of the frame line 68A on the monitor 34 in accordance with the given size change instruction. It should be noted that the size change instruction is an example of a "size change instruction" according to the technology of the present disclosure. It should be noted that the pinch-in and pinch-out operations are merely an example of a unit that receives the size change instruction from the user 11, and the unit is not limited as long as the position change instruction from the user 11 can be received via the reception unit 60.

After changing the position and the size of the AF frame 68, the user 11 performs an AF operation of pushing the release button 26 to the half push position. Here, the AF operation is an example of a "focus operation" according to the technology of the present disclosure. In a case in which the AF operation is performed, the training data generation unit 53 designates the region surrounded by the frame line 68A in the live view image 66 as a focus target region F.

Figure 9:
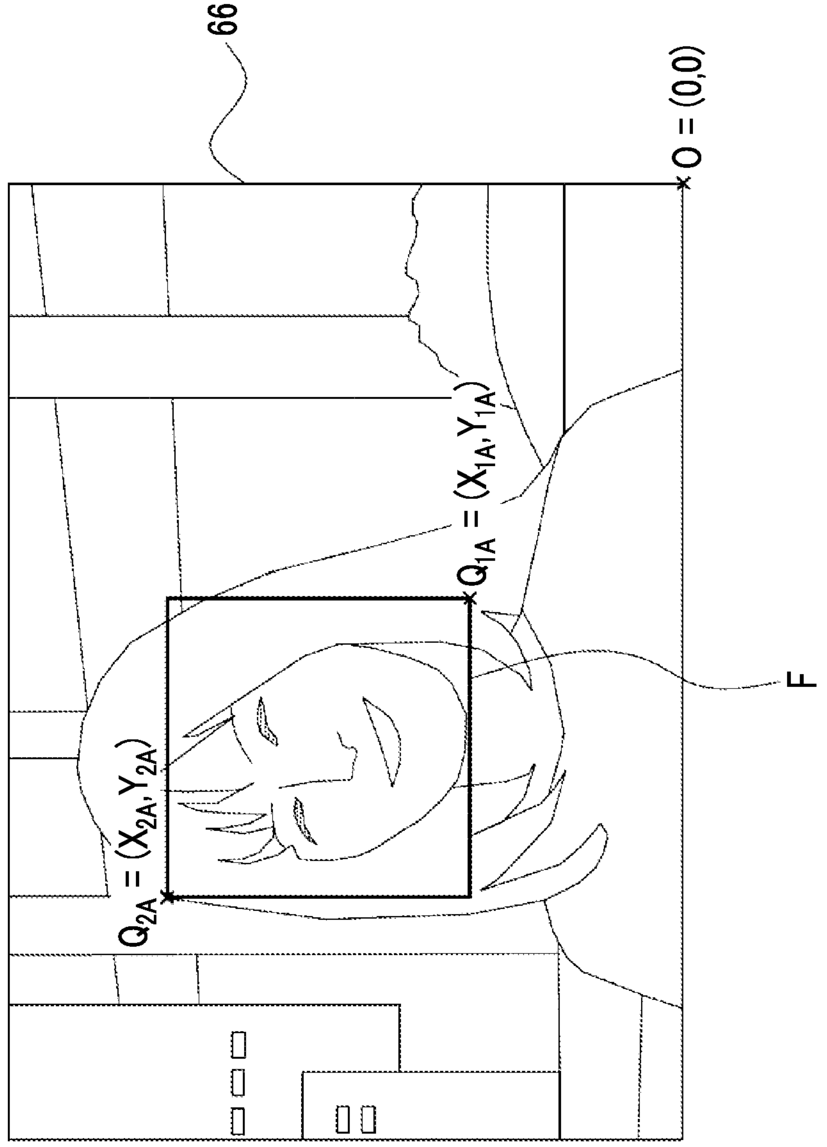
FIG. 9 is an explanatory diagram showing an example of position coordinates of the AF frame.

The training data generation unit 53 acquires position coordinates indicating a position of the focus target region F. As an example, as shown in FIG. 9, the position coordinates of the focus target region F are represented by coordinates $(X_{1A},Y_{1A})$ of a lower right angle $Q_{1A}$ of the frame line 68A and coordinates $(X_{2A},Y_{2A})$ of an upper left angle $Q_{2A}$ of the frame line 68A with a lower left corner of the live view image 66 as an origin O (0,0). The training data generation unit 53 stores the acquired position coordinates of the focus target region F in the RAM 50C. It should be noted that the position coordinates are an example of "coordinates" according to the technology of the present disclosure.

Figure 10:
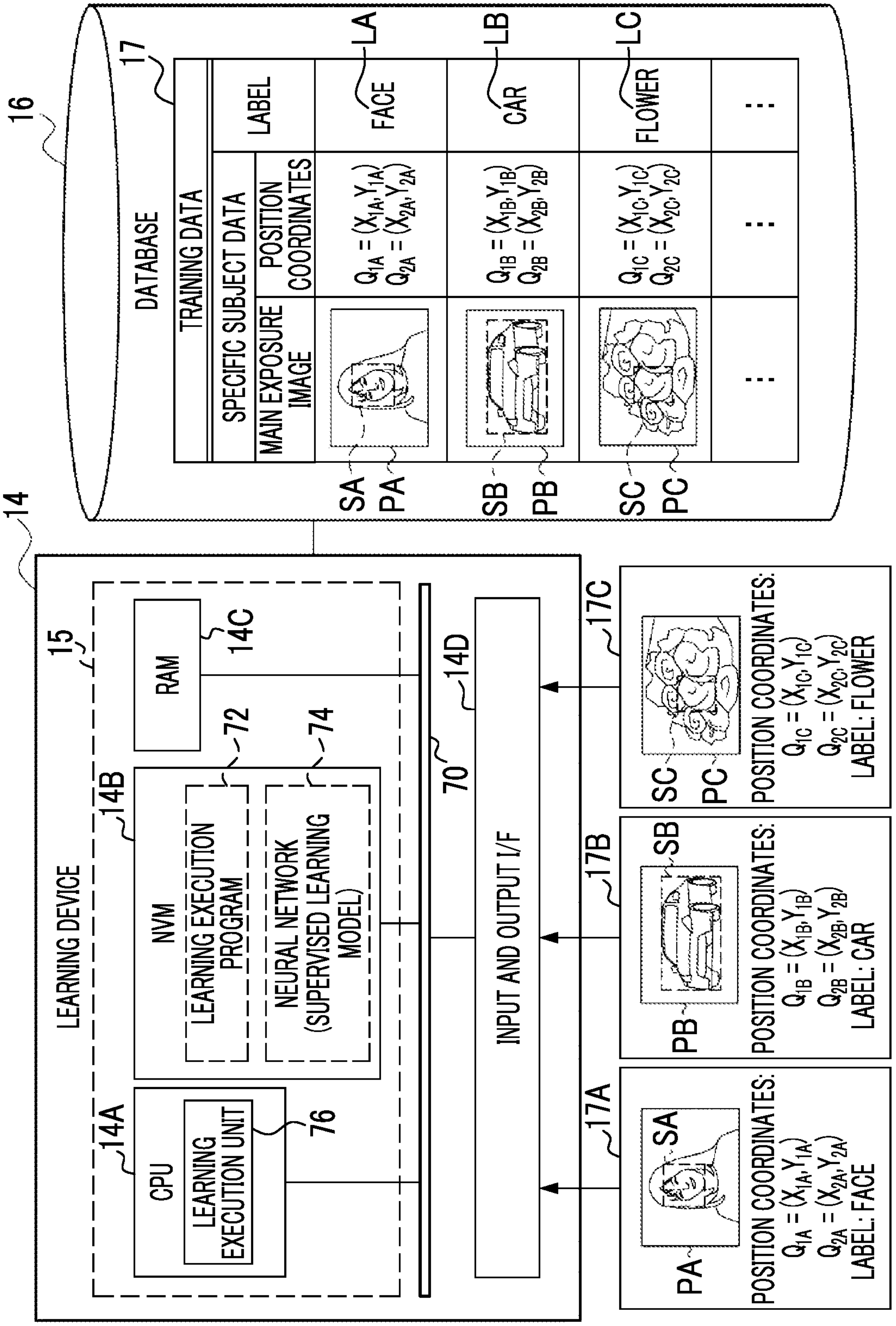
FIG. 10 is an explanatory diagram showing an example of an aspect in which training data output from an information processing apparatus according to a first embodiment is stored in a database.

In a case in which the user 11 pushes the release button 26 to the full push position after performing the AF operation, the main exposure operation is performed by the imaging apparatus 12, and the training data generation unit 53 extracts the image indicating the focus target region F as the specific subject image SA from the main exposure image PA. As an example, as shown in FIG. 10, the training data generation unit 53 outputs the specific subject data related to the specific subject image SA and the label LA in association with each other to the learning device 14 as the training data 17A. The specific subject data related to the specific subject image SA includes the main exposure image PA and the position coordinates indicating a position of the specific subject image SA in the main exposure image PA, that is, the position coordinates of the focus target region F.

Similarly, in the training data imaging mode, in a case in which the user 11 moves the AF frame 68 so as to surround the specific subject B and then causes the imaging apparatus 12 to perform the AF operation and the main exposure operation, the training data generation unit 53 extracts the image indicating the focus target region F as the specific subject image SB from the main exposure image PB. The training data generation unit 53 outputs the specific subject data related to the specific subject image SB and the label LB in association with each other to the learning device 14 as the training data 17B. The specific subject data related to the specific subject image SB includes the main exposure image PB, and the position coordinates indicating a position of the specific subject image SB in the main exposure image PB.

Similarly, in the training data imaging mode, in a case in which the user 11 moves the AF frame 68 so as to surround the specific subject C and then causes the imaging apparatus 12 to perform the AF operation and the main exposure operation, the training data generation unit 53 extracts the image indicating the focus target region F as the specific subject image SC from the main exposure image PC. The training data generation unit 53 outputs the specific subject data related to the specific subject image SC and the label LC in association with each other to the learning device 14 as the training data 17C. The specific subject data related to the specific subject image SC includes the main exposure image PC, and the position coordinates indicating a position of the specific subject image SC in the main exposure image PC.

The learning device 14 comprises a computer 15 and an input and output I/F 14D. The input and output I/F 14D is communicably connected to the communication I/F 56 of the imaging apparatus 12. The input and output I/F 14D receives the training data 17 from the imaging apparatus 12. The computer 15 stores the training data 17 received by the input and output I/F 14D in the database 16. In addition, the computer 15 reads out the training data 17 from the database 16 and performs the machine learning using the read out training data 17.

The computer 15 comprises a CPU 14A, an NVM 14B, and a RAM 14C. The CPU 14A controls the entire learning device 14. Examples of the NVM 14B include an EEPROM. It should be noted that the EEPROM is merely an example. For example, a ferroelectric memory may be used instead of the EEPROM, and any memory may be used as long as it is a non-volatile memory that can be mounted on the learning device 14. The RAM 14C is a volatile memory used as a work area or the like in a case in which various programs are executed.

A learning execution program 72 is stored in the NVM 14B. The CPU 14A reads out the learning execution program 72 from the NVM 14B and executes the read out learning execution program 72 on the RAM 14C to be operated as a learning execution unit 76. The learning execution unit 76 constructs a supervised learning model by training a neural network 74 using the training data 17 in accordance with the learning execution program 72.

Figure 11:
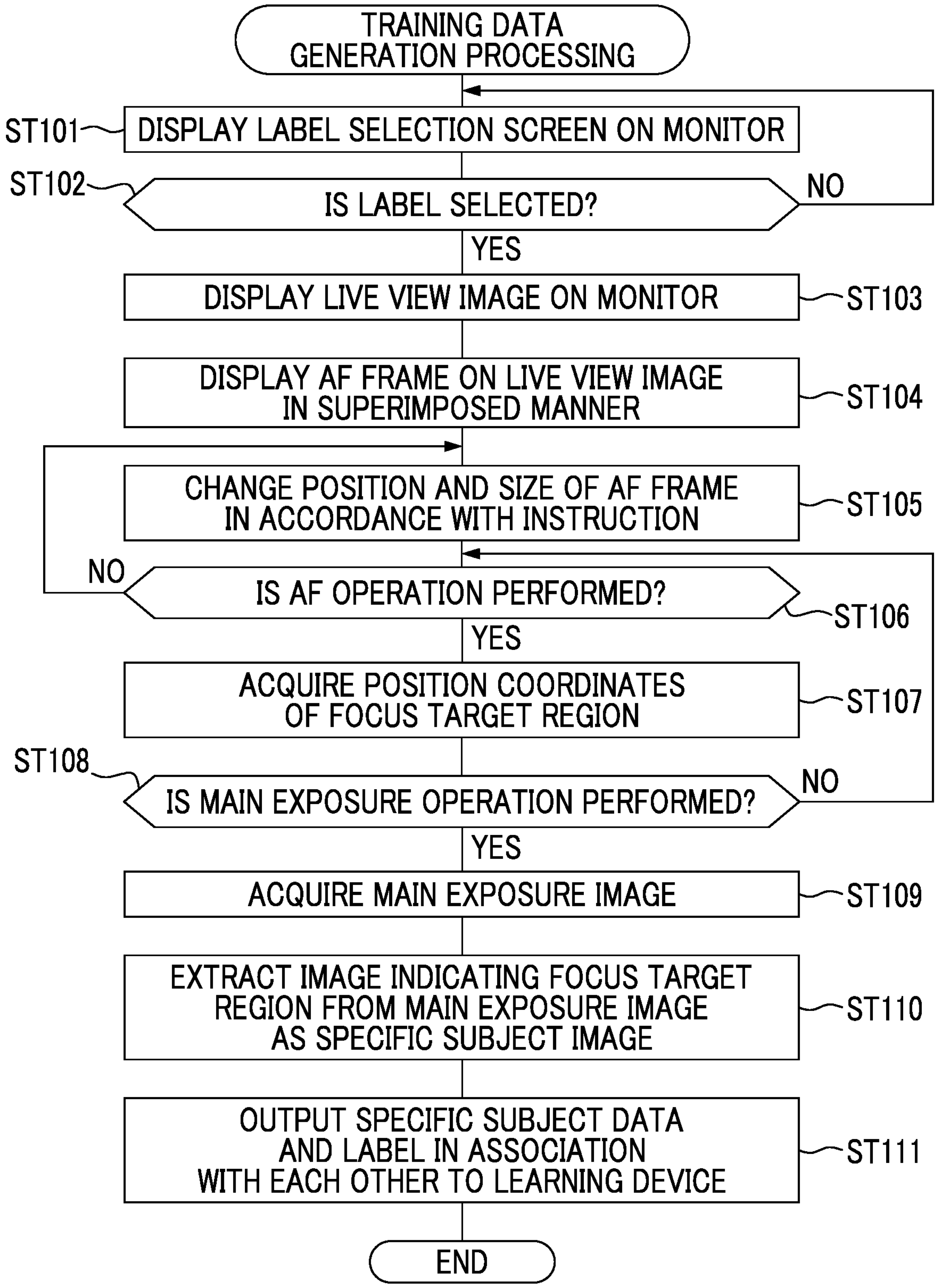
FIG. 11 is a flowchart showing an example of a flow of training data generation processing performed by the information processing apparatus according to the first embodiment.

Next, an action of the imaging apparatus 12 according to the first embodiment will be described with reference to FIG. 11. FIG. 11 shows an example of a flow of the training data generation processing executed by the training data generation unit 53. The training data generation processing is realized by executing the training data generation program 51A by the CPU 50A. The training data generation processing is started in a case in which the imaging apparatus 12 is set in the training data imaging mode.

In the training data generation processing shown in FIG. 11, first, in step ST101, the training data generation unit 53 displays, for example, the label selection screen 64 as shown in FIG. 5 on the touch panel monitor 30. Thereafter, the training data generation processing proceeds to step ST102.

In step ST102, the training data generation unit 53 determines whether or not the label L is selected on the touch panel monitor 30. In a case in which the label L is selected in step ST102, a positive determination is made, and the training data generation processing proceeds to step ST103. In step ST102, in a case in which the label L is not selected, a negative determination is made, and the training data generation processing proceeds to step ST101.

In step ST103, the training data generation unit 53 displays the live view image 66 on the touch panel monitor 30. Thereafter, the training data generation processing proceeds to step ST104.

In step ST104, the training data generation unit 53 displays the AF frame 68 on the live view image 66, which is displayed on the touch panel monitor 30, in a superimposed manner. Thereafter, the training data generation processing proceeds to step ST105.

In step ST105, the training data generation unit 53 changes the position and the size of the AF frame 68 in accordance with the position change instruction and the size change instruction from the user 11. In the live view image 66, the user 11 gives the position change instruction and the size change instruction via the reception unit 60 such that the region indicating the specific subject is surrounded by the frame line 68A of the AF frame 68. Thereafter, the training data generation processing proceeds to step ST106.

In step ST106, the training data generation unit 53 determines whether or not the AF operation is performed. In a case in which the AF operation is performed in step ST106, a positive determination is made, and the training data generation processing proceeds to step ST107. In step ST106, in a case in which the AF operation is not performed, a negative determination is made, and the training data generation processing proceeds to step ST105.

In step ST107, the training data generation unit 53 acquires the position coordinates of the focus target region F indicated by the AF frame 68. Thereafter, the training data generation processing proceeds to step ST108.

In step ST108, the training data generation unit 53 determines whether or not the main exposure is performed. In a case in which the main exposure is performed in step ST108, a positive determination is made, and the training data generation processing proceeds to step ST109. In step ST108, in a case in which the main exposure is not performed, a negative determination is made, and the training data generation processing proceeds to step ST106.

In step ST109, the training data generation unit 53 acquires the main exposure image P. Thereafter, the training data generation processing proceeds to step ST110.

In step ST110, the training data generation unit 53 extracts the image indicating the focus target region F as the specific subject image S from the main exposure image P. Thereafter, the training data generation processing proceeds to step ST111.

In step ST111, the training data generation unit 53 outputs the specific subject data and the label L in association with each other to the learning device 14. The specific subject data includes the main exposure image P and the position coordinates of the specific subject image S, that is, the position coordinates of the focus target region F. The learning device 14 stores the received specific subject data and label L in the database 16 as the training data 17. As a result, the training data generation processing ends.

As described above, in the first embodiment, in a case in which the main exposure operation accompanied by the focus operation in which the specific subject is used as the focus target region is performed by the image sensor 24, the training data generation unit 53 outputs the specific subject data related to the specific subject image S in the main exposure image P obtained by the main exposure operation as the training data 17 used in the machine learning. Therefore, with the present configuration, the training data 17 used in the machine learning can be more easily collected than in a case in which the specific subject image S is manually extracted from the main exposure image P obtained by the imaging with the image sensor 24.

In addition, in the first embodiment, the machine learning is the supervised machine learning. The training data generation unit 53 gives the label L, which is the information related to the specific subject image S, to the specific subject data, and outputs the specific subject data as the training data 17 used in the supervised machine learning. Therefore, with the present configuration, the training data 17 needed for the supervised machine learning can be collected.

In addition, in the first embodiment, the training data generation unit 53 displays the live view image 66 based on the imaging signal output from the image sensor 24 on the monitor 34. In the live view image 66, the training data generation unit 53 uses the AF frame 68 to display the focus target region F in an aspect that is distinguishable from other image regions. The specific subject image S is the image corresponding to the position of the focus target region F in the main exposure image P. Therefore, with the present configuration, the specific subject image S can be easily extracted than in a case in which the specific subject image S is irrelevant to the position of the focus target region F.

In addition, in the first embodiment, the training data generation unit 53 displays the AF frame 68 that surrounds the focus target region F on the live view image 66 to display the focus target region F in the aspect that is distinguishable from other image regions. Therefore, with the present configuration, it is easier for the user 11 to recognize the specific subject image S than in a case in which the AF frame 68 is not displayed.

In addition, in the first embodiment, the position of the AF frame 68 can be changed in accordance with the given position change instruction. Therefore, with the present configuration, the user 11 can more freely move the focus target region F than in a case in which the position of the AF frame 68 is fixed.

In addition, in the first embodiment, the size of the AF frame 68 can be changed in accordance with the given size change instruction. Therefore, with the present configuration, the user 11 can more freely change the size of the focus target region F than in a case in which the size of the AF frame 68 is fixed.

In addition, in the first embodiment, the position coordinates of the specific subject image S are included in the specific subject data. The training data generation unit 53 outputs the main exposure image P and the position coordinates of the focus target region F, that is, the position coordinates of the specific subject image S as the training data 17 used in the machine learning. Therefore, with the present configuration, there is an advantage that the number of processing steps can be made smaller than in a case in which the specific subject image S is cut out and output.

In addition, in the first embodiment, the learning device 14 comprises the input and output I/F 14D that receives the specific subject data output from the controller 50 of the imaging apparatus 12, and the computer 15 that performs the machine learning using the specific subject data received by the input and output I/F 14D. In addition, the imaging apparatus 12 comprises the controller 50 and the image sensor 24. Therefore, with the present configuration, the learning device 14 can more easily collect the training data 17 used in the learning than in a case in which the specific subject image S used in the learning is manually selected from the main exposure image P obtained by the imaging with the image sensor 24.

It should be noted that, in the first embodiment, as shown in FIG. 1 as an example, one user 11 images a plurality of specific subjects A, B, and C by using the same imaging apparatus 12 to acquire the training data 17A, 17B, and 17C, but the technology of the present disclosure is not limited to this. A plurality of users may image different subjects by using different imaging apparatuses 12, and the training data 17 may be output from the plurality of imaging apparatuses 12 to the same learning device 14. In this case, since the training data 17 acquired by the plurality of users are output to the same learning device 14, the learning device 14 can efficiently collect the training data 17.

In addition, in the first embodiment, the training data generation unit 53 outputs the coordinates of the lower right angle $Q_{1A}$ and the upper left angle $Q_{2A}$ of the frame line 68A as the position coordinates of the specific subject image S, but the technology of the present disclosure is not limited to this. The training data generation unit 53 may output coordinates of an upper right corner and a lower left corner of the frame line 68A. Alternatively, the training data generation unit 53 may output coordinates of one corner of the frame line 68A and lengths of vertical and horizontal sides constituting the frame line 68A. Alternatively, the training data generation unit 53 may output coordinates of the center of the frame line 68A and lengths from the center to the vertical and horizontal sides. In addition, the position coordinates of the specific subject image S are represented by the coordinates in a case in which the lower left corner of the live view image 66 is used as the origin. However, the technology of the present disclosure is not limited to this, and other corners of the live view image 66 may be used as the origin, or the center of the live view image 66 may be used as the origin.

Second Embodiment

A second embodiment is different from the first embodiment in that the focus target region F designated by being surrounded by the AF frame 68 is not extracted as the specific subject image S. In the following, a difference from the first embodiment will be described in detail. In the following description, the same configuration and action as those of the first embodiment will be designated by the same reference numerals, and the description thereof will be omitted.

Figure 12:
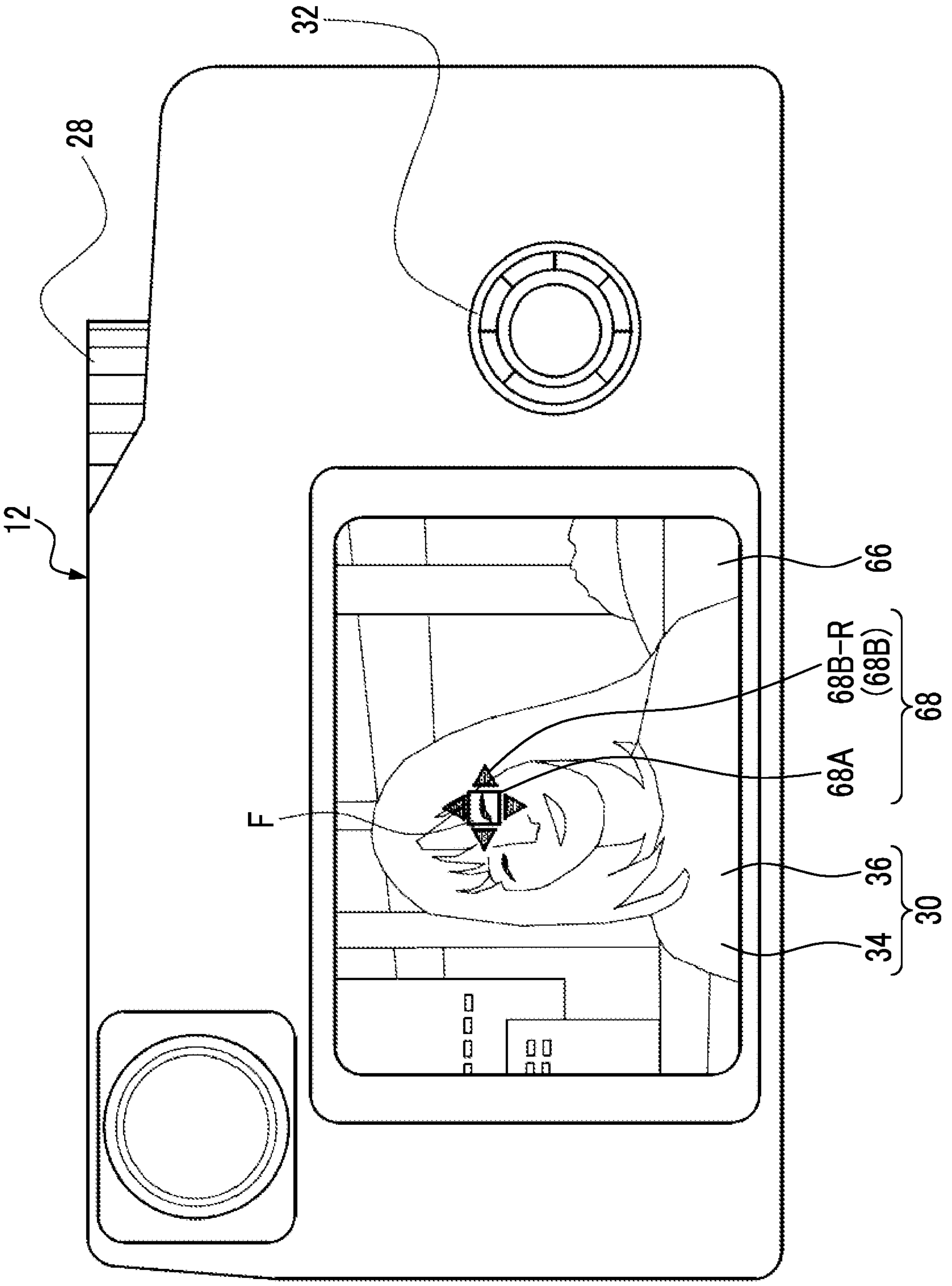
FIG. 12 is a rear view of the imaging apparatus showing an example of an aspect in which the position and the size of the AF frame are changed in accordance with a position of a left eye of the subject.

As an example, as shown in FIG. 12, in the second embodiment, on the touch panel monitor 30, the live view image 66 based on the imaging signal output from the image sensor 24 is displayed, and the AF frame 68 is displayed on the live view image 66 in a superimposed manner. In the example shown in FIG. 12, the training data generation unit 53 receives the position change instruction and the size change instruction from the user 11 via the reception unit 60 in the live view image 66 to dispose the AF frame 68 on the image indicating the left eye of the specific subject A. Thereafter, the region of the left eye of the specific subject A surrounded by the frame line 68A is designated as the focus target region F by performing the AF operation. The training data generation unit 53 receives the designation of the focus target region F in the live view image 66. Thereafter, the imaging apparatus 12 performs the main exposure operation, so that the training data generation unit 53 acquires the main exposure image P in which the focus target region F is in focus.

Figure 13:
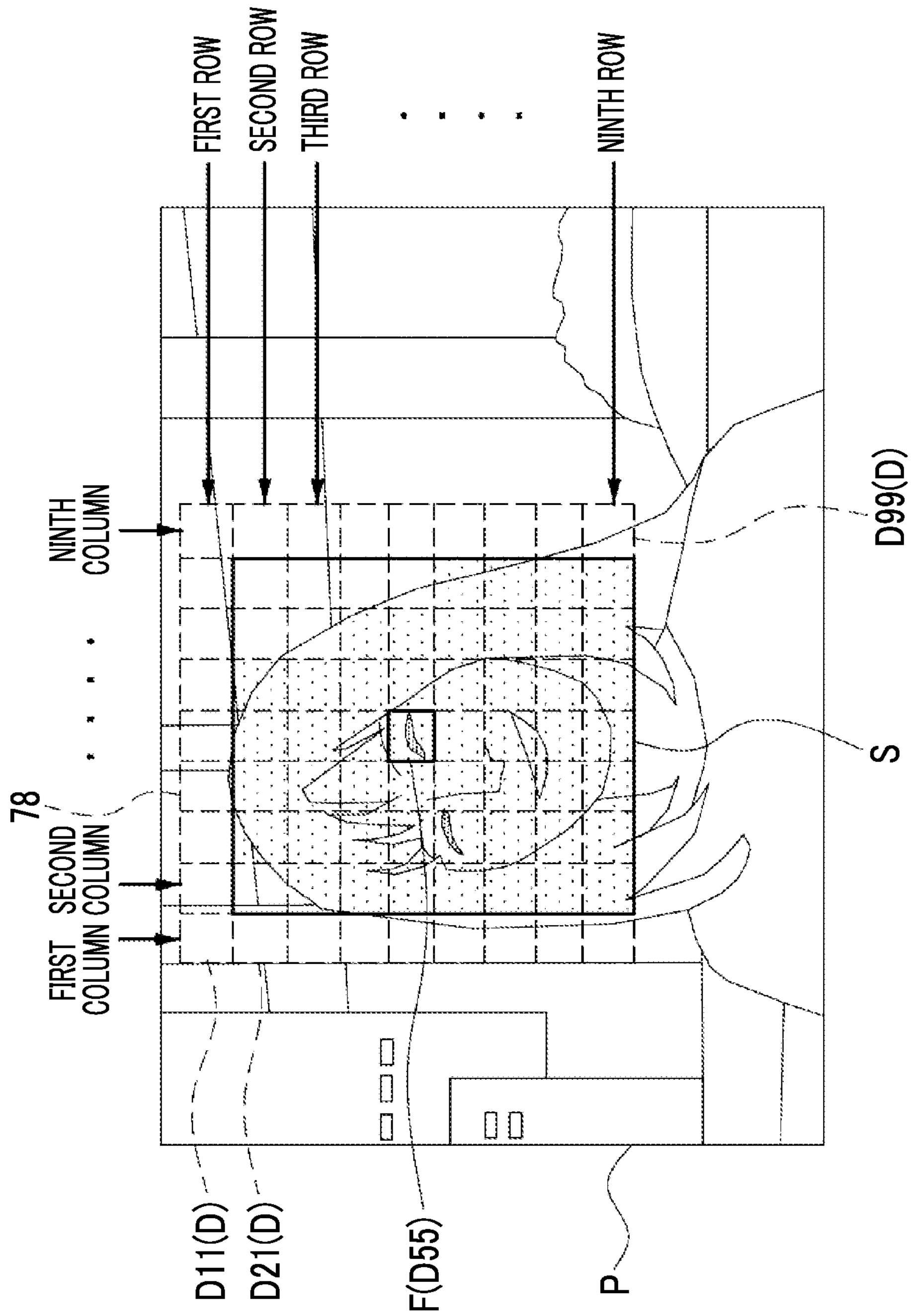
FIG. 13 is an explanatory diagram showing an example of an aspect in which the information processing apparatus according to a second embodiment extracts a specific subject image from a main exposure image in accordance with an inter-focus position distance for each division region.

As an example, as shown in FIG. 13, the training data generation unit 53 sets a candidate region 78 including the focus target region F in the main exposure image P obtained by the imaging. The candidate region 78 is a region which is a candidate for extracting the specific subject image S. It should be noted that the candidate region 78 is an example of a "predetermined region" according to the technology of the present disclosure.

The candidate region 78 is divided into a matrix of 9 rows×9 columns, for example. In the following, in order to distinguish and represent each division region, as shown in FIG. 13, reference numerals are designated in accordance with the positions of the division regions for convenience of description. For example, a reference numeral D11 is designated to the division region positioned in the first row and the first column of the candidate region 78, and a reference numeral D21 is designated to the division region positioned in the second row and the first column of the candidate region 78. In addition, in a case in which the distinction is not needed, the division regions are collectively referred to as a "division region D". It should be noted that the division region D is an example of a "division region" according to the technology of the present disclosure.

A division region D55 positioned at the center of the candidate region 78 matches the focus target region F. That is, the position and the size of the focus target region F are designated in units of the division regions D.

Figure 14:
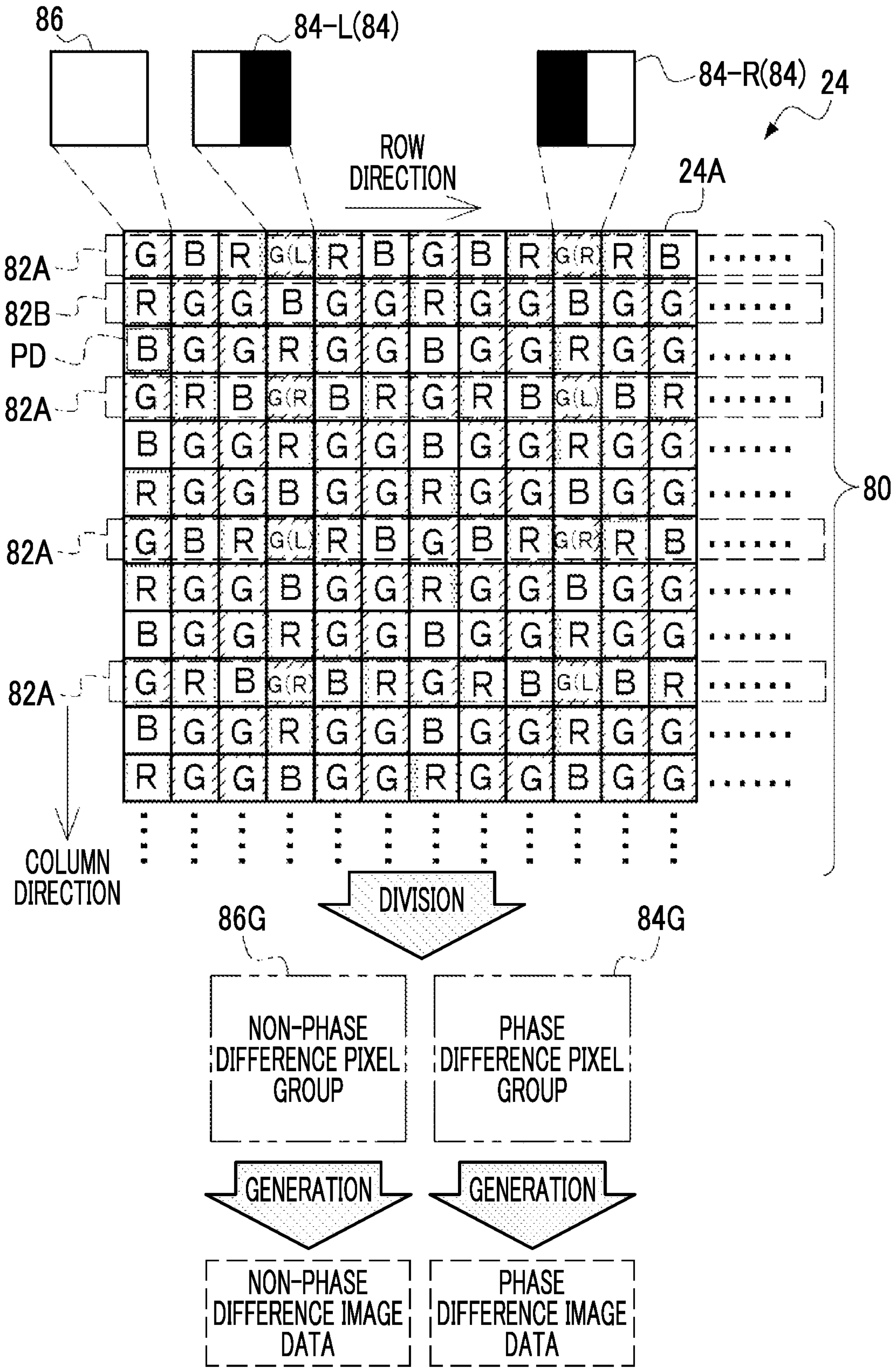
FIG. 14 is a schematic view showing an example of disposition of each pixel included in a photoelectric conversion element of the imaging apparatus including the information processing apparatus according to the second embodiment.

As an example, as shown in FIG. 14, the image sensor 24 comprises a photoelectric conversion element 80. The photoelectric conversion element 80 has a plurality of photosensitive pixels disposed in a matrix, and the light-receiving surface 24A is formed by these photosensitive pixels. The photosensitive pixel is a pixel having a photodiode PD, photoelectrically converts the received light, and outputs an electric signal in accordance with a light-receiving amount. The image data of each division region D is generated based on the electric signals output from a plurality of photodiodes PD.

A color filter is disposed on the photodiode PD. The color filters include a green (G) filter corresponding to a G wavelength range which most contributes to obtaining a brightness signal, a red (R) filter corresponding to an R wavelength range, and a blue (B) filter corresponding to a B wavelength range.

The photoelectric conversion element 80 comprises two types of photosensitive pixels of a phase difference pixel 84 and a non-phase difference pixel 86 which is a pixel different from the phase difference pixel 84. Generally, the non-phase difference pixel 86 is also referred to as a normal pixel. The photoelectric conversion element 80 has three types of photosensitive pixels of R pixel, G pixel, and B pixel, as the non-phase difference pixel 86. The R pixel, the G pixel, the B pixel, and the phase difference pixel 84 are regularly disposed with a predetermined periodicity in a row direction (for example, a horizontal direction in a state in which a bottom surface of the imaging apparatus body 20 is in contact with a horizontal surface) and a column direction (for example, a vertical direction which is a direction vertical to the horizontal direction). The R pixel is a pixel corresponding to the photodiode PD in which the R filter is disposed, the G pixel and the phase difference pixel 84 are pixels corresponding to the photodiode PD in which the G filter is disposed, and the B pixel is a pixel corresponding to the photodiode PD in which the B filter is disposed.

A plurality of phase difference pixel lines 82A and a plurality of non-phase difference pixel lines 82B are arranged on the light-receiving surface 24A. The phase difference pixel line 82A is a horizontal line including the phase difference pixels 84. Specifically, the phase difference pixel line 82A is the horizontal line in which the phase difference pixels 84 and the non-phase difference pixels 86 are mixed. The non-phase difference pixel line 82B is a horizontal line including only a plurality of non-phase difference pixels 86.

On the light-receiving surface 24A, the phase difference pixel lines 82A and the non-phase difference pixel lines 82B for a predetermined number of lines are alternately disposed along the column direction. For example, the "predetermined number of lines" used herein refers to two lines. It should be noted that, here, the predetermined number of lines is described as two lines, but the technology of the present disclosure is not limited to this, and the predetermined number of lines may be three or more lines, dozen lines, a few tens of lines, a few hundred lines, and the like.

The phase difference pixel lines 82A are arranged in the column direction by skipping two lines from the first row to the last row. A part of the pixels of the phase difference pixel lines 82A is the phase difference pixel 84. Specifically, the phase difference pixel line 82A is a horizontal line in which the phase difference pixels 84 and the non-phase difference pixels 86 are periodically arranged.

The phase difference pixel 84 is roughly divided into a first phase difference pixel 84-L and a second phase difference pixel 84-R. In the phase difference pixel line 82A, the first phase difference pixels 84-L and the second phase difference pixels 84-R are alternately disposed at intervals of several pixels in a line direction as the G pixels.

The first phase difference pixels 84-L and the second phase difference pixels 84-R are disposed to be alternately present in the column direction. In the example shown in FIG. 14, in the fourth column, the first phase difference pixel 84-L the second phase difference pixel 84-R, the first phase difference pixel 84-L, and the second phase difference pixel 84-R are disposed in this order along the column direction from the first row. That is, the first phase difference pixel 84-L and the second phase difference pixel 84-R are alternately DISPOSED along the column direction from the first row. In addition, in the example shown in FIG. 14, in the tenth column, the second phase difference pixel 84-R, the first phase difference pixel 84-L, the second phase difference pixel 84-R, and the first phase difference pixel 84-L are disposed in this order along the column direction from the first row. That is, the second phase difference pixels 84-R and the first phase difference pixels 84-L are alternately disposed along the column direction from the first row.

Figure 15:
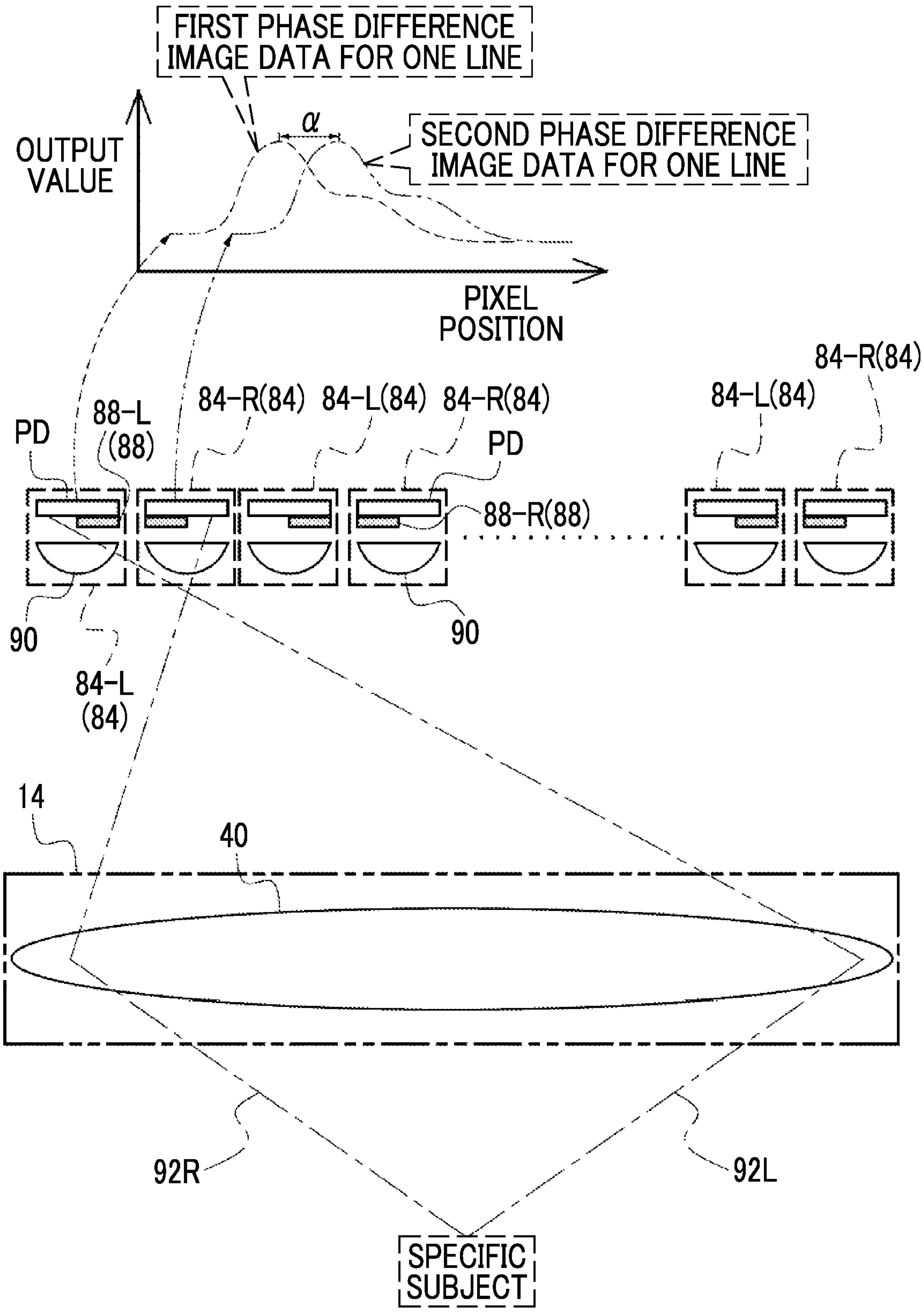
FIG. 15 is a conceptual diagram showing an example of an incidence characteristic of subject light on a first phase difference pixel and a second phase difference pixel included in the photoelectric conversion element shown in FIG. 14.

As an example, as shown in FIG. 15, the first phase difference pixel 84-L comprises a light shielding member 88-L, a microlens 90, and a photodiode PD. In the first phase difference pixel 84-L, the light shielding member 88-L is disposed between the microlens 90 and the light-receiving surface of the photodiode PD. A left half (left side in a case of facing the subject from the light-receiving surface, in other words, a right side in a case of facing the light-receiving surface from the subject) of the light-receiving surface of the photodiode PD in the row direction is shielded against the light by the light shielding member 88-L.

The second phase difference pixel 84-R comprises a light shielding member 88-R, the microlens 90, and the photodiode PD. In the second phase difference pixel 84-R, the light shielding member 88-R is disposed between the microlens 90 and the light-receiving surface of the photodiode PD.

A right half (right side in a case of facing the subject from the light-receiving surface, in other words, a left side in a case of facing the light-receiving surface from the subject) of the light-receiving surface of the photodiode PD in the row direction is shielded against the light by the light shielding member 88-R. It should be noted that, in the following, for convenience of description, in a case in which the distinction is not needed, the light shielding members 88-L and 88-R are referred to as a "light shielding member 88".

Luminous flux passing through an exit pupil of the imaging lens 40 is roughly divided into left region passing light 92L and right region passing light 92R. The left region passing light 92L refers to the left half luminous flux of the luminous flux passing through the exit pupil of the imaging lens 40 in a case of facing the subject side from the phase difference pixel 84 side. The right region passing light 92R refers to the right half luminous flux of the luminous flux passing through the exit pupil of the imaging lens 40 in a case of facing the subject side from the phase difference pixel 84 side. The luminous flux passing through the exit pupil of the imaging lens 40 is divided into the right and left by the microlens 90, the light shielding member 88-L, and the light shielding member 88-R functioning as a pupil division unit. The first phase difference pixel 84-L receives the left region passing light 92L as the subject light, and the second phase difference pixel 84-R receives the right region passing light 92R as the subject light. As a result, first phase difference image data corresponding to the subject image corresponding to the left region passing light 92L and second phase difference image data corresponding to the subject image corresponding to the right region passing light 92R are generated by the photoelectric conversion element 80.

The training data generation unit 53 acquires the first phase difference image data for one line from the first phase difference pixel 84-L disposed on the same phase difference pixel line 82A from the phase difference pixels 84 that image the focus target region F, and acquire s the second phase difference image data for one line from the second phase difference pixel 84-R disposed on the same phase difference pixel line 82A. The training data generation unit 53 measures the distance to the focus target region F based on the deviation amount a between the first phase difference image data for one line and the second phase difference image data for one line. It should be noted that, since a method of deriving the distance to the focus target region F based on the deviation amount a is a known technology, the detailed description thereof will be omitted here.

The training data generation unit 53 derives the focus position of the focus lens 40B by performing the AF calculation based on the measured distance to the focus target region F. In the following, the focus position of the focus lens 40B derived based on the distance to the focus target region F is also referred to as a "focus target region focus position". The training data generation unit 53 performs the focus operation of focusing the focus lens 40B on the focus target region focus position.

In addition, for each division region D, the training data generation unit 53 acquires the first phase difference image data for one line from the first phase difference pixel 84-L disposed on the same phase difference pixel line 82A from the phase difference pixels 84 that image each division region D, and acquires the second phase difference image data for one line from the second phase difference pixel 84-R disposed on the same phase difference pixel line 82A. The training data generation unit 53 measures the distance to each division region D based on the deviation amount a between the first phase difference image data for one line and the second phase difference image data for one line.

The training data generation unit 53 derives the focus position of the focus lens 40B in each division region D by performing the AF calculation based on the measured distance to each division region D. In the following, the focus position of the focus lens 40B derived based on the distance to each division region D is also referred to as a "division region focus position".

For each division region D, the training data generation unit 53 determines whether or not a distance from the focus target region focus position to the division region focus position (hereinafter, referred to as an "inter-focus position distance") is smaller than a predetermined distance threshold value. The training data generation unit 53 specifies the division region D of which the inter-focus position distance is smaller than the distance threshold value as a region having a high degree of similarity to the focus target region F. Here, the distance threshold value is a value derived in advance as a threshold value for extracting the specific subject image S by, for example, a test with an actual machine and/or a computer simulation. The distance threshold value may be a fixed value or may be a variable value that is changed in accordance with the given instruction and/or condition (for example, the imaging condition).

It should be noted that the inter-focus position distance is an example of a "similarity evaluation value" according to the technology of the present disclosure. In addition, the focus target region focus position is an example of a "focus evaluation value" according to the technology of the present disclosure. In addition, the distance threshold value is an example of a "first predetermined range" according to the technology of the present disclosure.

In the example shown in FIG. 13, the training data generation unit 53 calculates the inter-focus position distance for 80 division regions D excluding the focus target region F (division region D55) among 81 division regions D included in the candidate region 78. The training data generation unit 53 determines whether or not the calculated inter-focus position distance is smaller than the distance threshold value. In FIG. 13, the division region D indicated by hatching is a division region in which the inter-focus position distance is determined to be smaller than the distance threshold value, that is, the division region specified to have a high degree of similarity to the focus target region F.

The training data generation unit 53 extracts the specific subject image S from the main exposure image P based on the specified division region D. In the example shown in FIG. 13, the training data generation unit 53 extracts the rectangular specific subject image S in units of the division regions D so as to surround the specified division regions D in just proportions.

Figure 16:
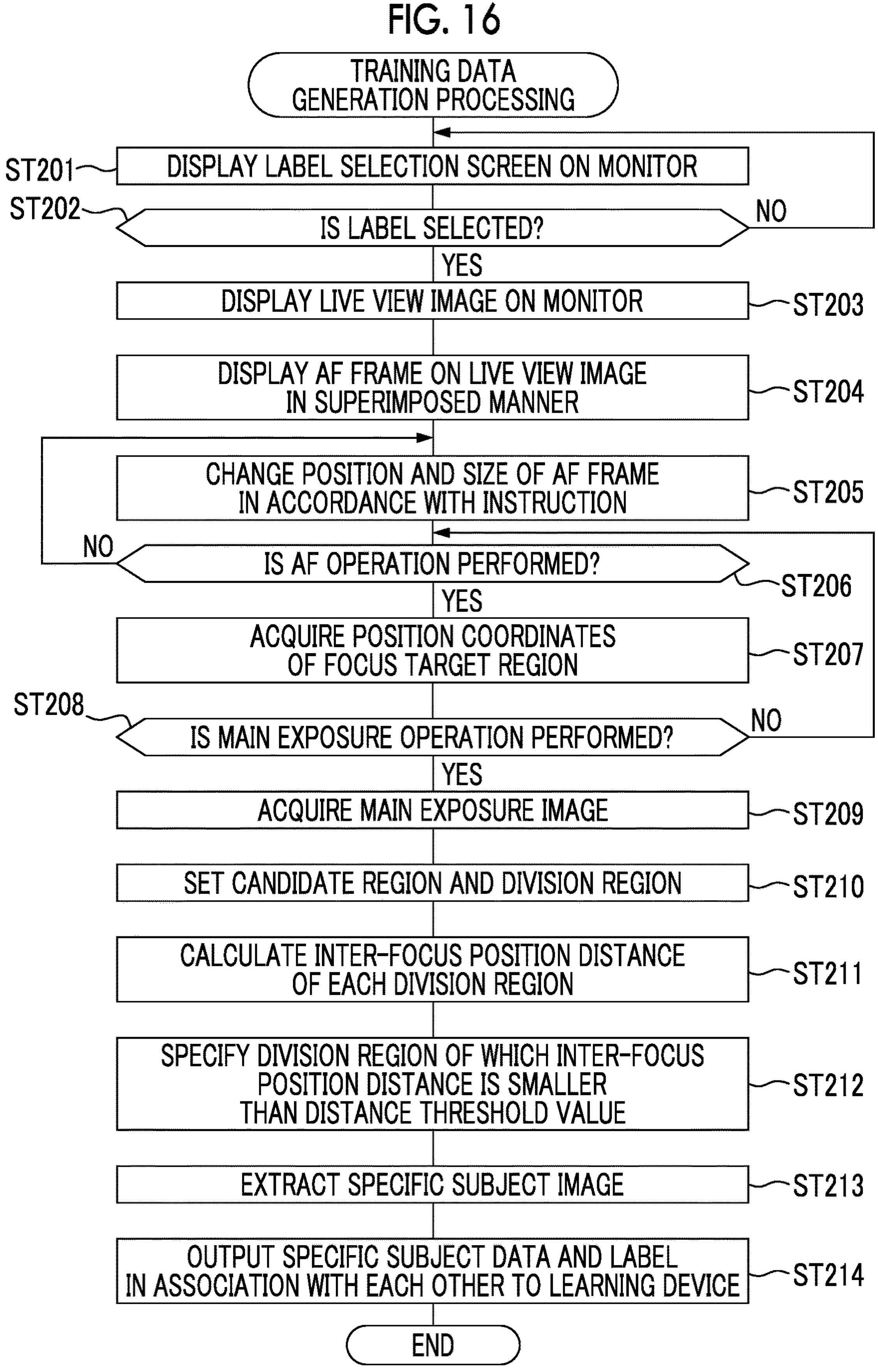
FIG. 16 is a flowchart showing an example of a flow of the training data generation processing performed by the information processing apparatus according to the second embodiment.

Next, an action of the imaging apparatus 12 according to the second embodiment will be described with reference to FIG. 16. FIG. 16 shows an example of a flow of the training data generation processing according to the second embodiment.

In FIG. 16, since steps ST201 to ST209 are the same as steps ST101 to ST109 in FIG. 11, the description thereof will be omitted.

In step ST210, the training data generation unit 53 sets the candidate region 78 and the division region D in the main exposure image P. Thereafter, the training data generation processing proceeds to step ST211.

In step ST211, the training data generation unit 53 calculates the inter-focus position distance of each division region D. Thereafter, the training data generation processing proceeds to step ST212.

In step ST212, the training data generation unit 53 specifies the division region D of which the inter-focus position distance is smaller than the distance threshold value. Thereafter, the training data generation processing proceeds to step ST213.

In step ST213, the training data generation unit 53 extracts the specific subject image S from the main exposure image P based on the specified division region D. In addition, the training data generation unit 53 acquires the position coordinates of the extracted specific subject image S. Thereafter, the training data generation processing proceeds to step ST214.

In step ST214, the training data generation unit 53 outputs the specific subject data and the label L in association with each other to the learning device 14. The specific subject data is data including the main exposure image P and the position coordinates of the specific subject image S. The learning device 14 stores the received specific subject data and label L in the database 16 as the training data 17. As a result, the training data generation processing ends.

As described above, in the second embodiment, the training data generation unit 53 displays the live view image 66 based on the imaging signal output from the image sensor 24 on the touch panel monitor 30. The training data generation unit 53 receives the designation of the focus target region F in the live view image 66 from the user 11 via the reception unit 60. The training data generation unit 53 extracts the specific subject image S from the main exposure image P based on the division region D of which the inter-focus position distance indicating the degree of similarity to the focus target region F is smaller than the distance threshold value in the candidate region 78 including the focus target region F. Therefore, with the present configuration, the user 11 performs the imaging by using a part of the specific subject A as the focus target region F, so that the specific subject image S indicating the entire specific subject A is extracted from the main exposure image P. Therefore, the training data 17 used in the learning can be collected with a simpler operation than in a case in which it is necessary to designate the entire specific subject A as the focus target region F.

In addition, in the second embodiment, the training data generation unit 53 displays the AF frame 68 that surrounds the focus target region F to display the focus target region F in the aspect that is distinguishable from other image regions. Therefore, with the present configuration, it is easier for the user 11 to recognize the specific subject image S than in a case in which the AF frame 68 is not displayed.

In addition, in the second embodiment, at least one of the focus target region F or the specific subject image S is determined in units of the division regions D obtained by dividing the candidate region 78. Therefore, with the present configuration, the processing required for extracting the specific subject image S from the main exposure image P is easier than in a case in which the candidate region 78 is not divided.

In addition, in the second embodiment, the distance (inter-focus position distance) from the focus target region focus position used in the focus operation to the division region focus position is used as the similarity evaluation value indicating the degree of similarity to the focus target region F. Therefore, with the present configuration, the training data generation unit 53 can more easily extract the specific subject image S from the main exposure image P than in a case in which the focus target region focus position used in the focus operation is not used.

It should be noted that, in the second embodiment, as an example, as shown in FIG. 13, the focus target region F includes one division region D55, but the focus target region F may be designated to include two or more division regions D. In addition, the position and the size of the candidate region 78 are not limited to the example shown in FIG. 13, and the candidate region 78 can be set to any position and size as long as the focus target region F is included. In addition, the number, the position, and the size of the division regions D are not limited to the example shown in FIG. 13, and can be optionally changed.

It should be noted that, in the second embodiment, as shown in FIG. 13, the rectangular specific subject image S is shown, but the technology of the present disclosure is not limited to this. The training data generation unit 53 may extract only the division region D of which the inter-focus position distance to the focus target region F is smaller than the distance threshold value, that is, the division region D indicated by hatching in FIG. 13 in the main exposure image P, as the specific subject image S.

Third Embodiment

A third embodiment is different from the second embodiment in that a color evaluation value based on color information of the candidate region 78 is used as the similarity evaluation value instead of the inter-focus position distance. In the following, a difference from the second embodiment will be described. In the following description, the same configuration and action as those of the first and second embodiments will be designated by the same reference numerals, and the description thereof will be omitted.

Figure 17:
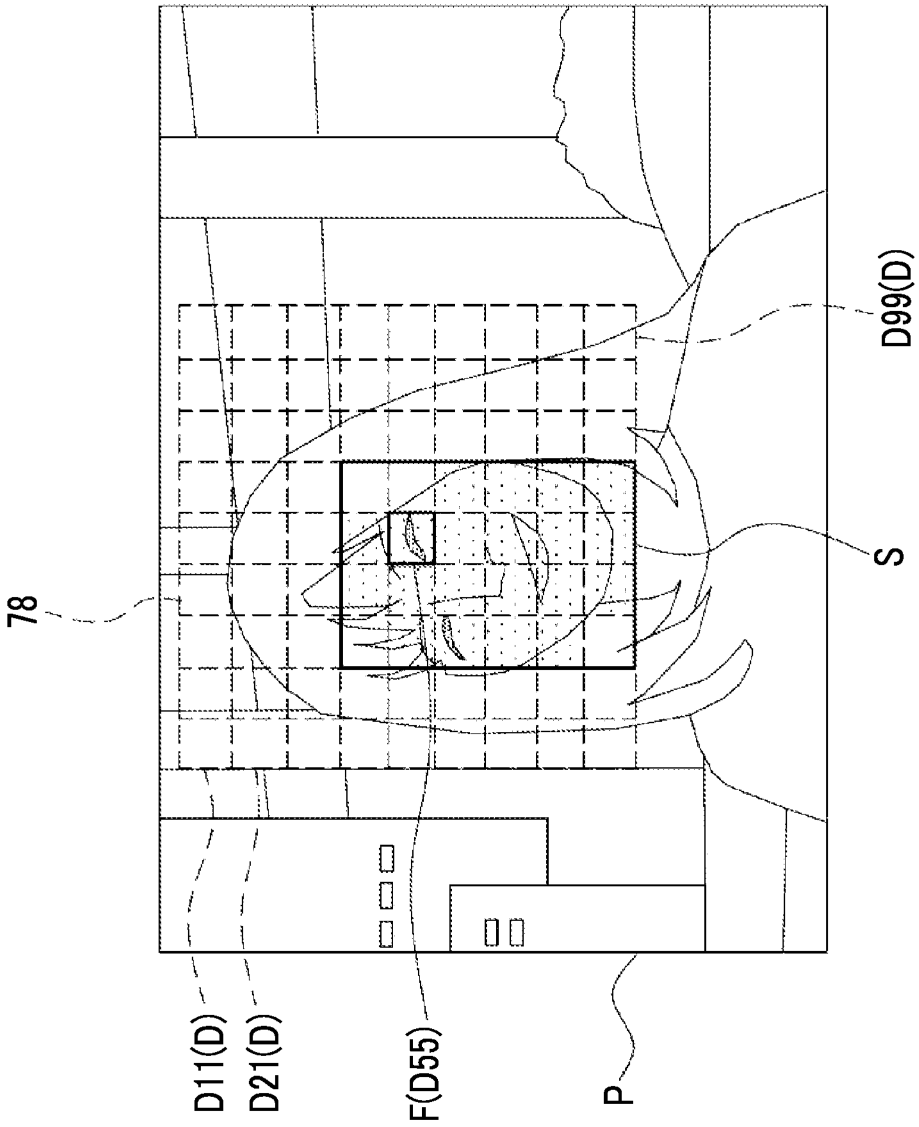
FIG. 17 is an explanatory diagram showing an example of an aspect in which the information processing apparatus according to a third embodiment extracts the specific subject image from the main exposure image in accordance with a color difference for each division region.

As shown in FIG. 17 as an example, the focus target region F, the candidate region 78, and a plurality of division regions D are set in the main exposure image P in the same manner as the second embodiment. The training data generation unit 53 calculates an RGB integrated value of each division region D. The RGB integrated value is a value obtained by integrating electric signals for each RGB in each division region D. In addition, the training data generation unit 53 calculates an RGB value indicating the color of each division region D based on the RGB integrated value.

The training data generation unit 53 calculates a color difference between the focus target region F and each division region D (hereinafter, simply referred to as a "color difference") with reference to the color of the division region D55 corresponding to the focus target region F. It should be noted that, in a case in which the RGB value of the focus target region F is ($R_F$, $G_F$, $B_F$) and the RGB value of the division region D is ($R_D$, $G_D$, $B_D$), the color difference between the focus target region F and the division region D is calculated by using the following expression.

$$\text{Color difference}=\{(R_D-R_F)^2+(G_D-G_F)^2+(B_D-B_F)^2\}^{1/2}$$

The training data generation unit 53 determines whether or not the calculated color difference for each division region D is smaller than a predetermined color difference threshold value. The training data generation unit 53 specifies the division region D of which the color difference is smaller than the color difference threshold value as the region having a high degree of similarity to the focus target region F. Here, the color difference threshold value is a value derived in advance as a threshold value for extracting the specific subject image S by, for example, a test with an actual machine and/or a computer simulation. The color difference threshold value may be a fixed value or may be a variable value that is changed in accordance with the given instruction and/or condition (for example, the imaging condition). It should be noted that the RGB value is an example of "color information" according to the technology of the present disclosure. In addition, the color difference is an example of a "similarity evaluation value" and a "color evaluation value" according to the technology of the present disclosure. In addition, the color difference threshold value is an example of a "first predetermined range" according to the technology of the present disclosure.

In the example shown in FIG. 17, the training data generation unit 53 calculates the color difference for 80 division regions D excluding the focus target region F (division region D55) among 81 division regions D included in the candidate region 78. The training data generation unit 53 determines whether or not the calculated color difference is smaller than the color difference threshold value. In FIG. 17, the division region D indicated by hatching is a division region in which the color difference is determined to be smaller than the color difference threshold value, that is, the division region specified to have a high degree of similarity to the focus target region F.

The training data generation unit 53 extracts the rectangular specific subject image S from the main exposure image P in units of the division regions D so as to surround the specified division regions D in just proportions.

Figure 18:
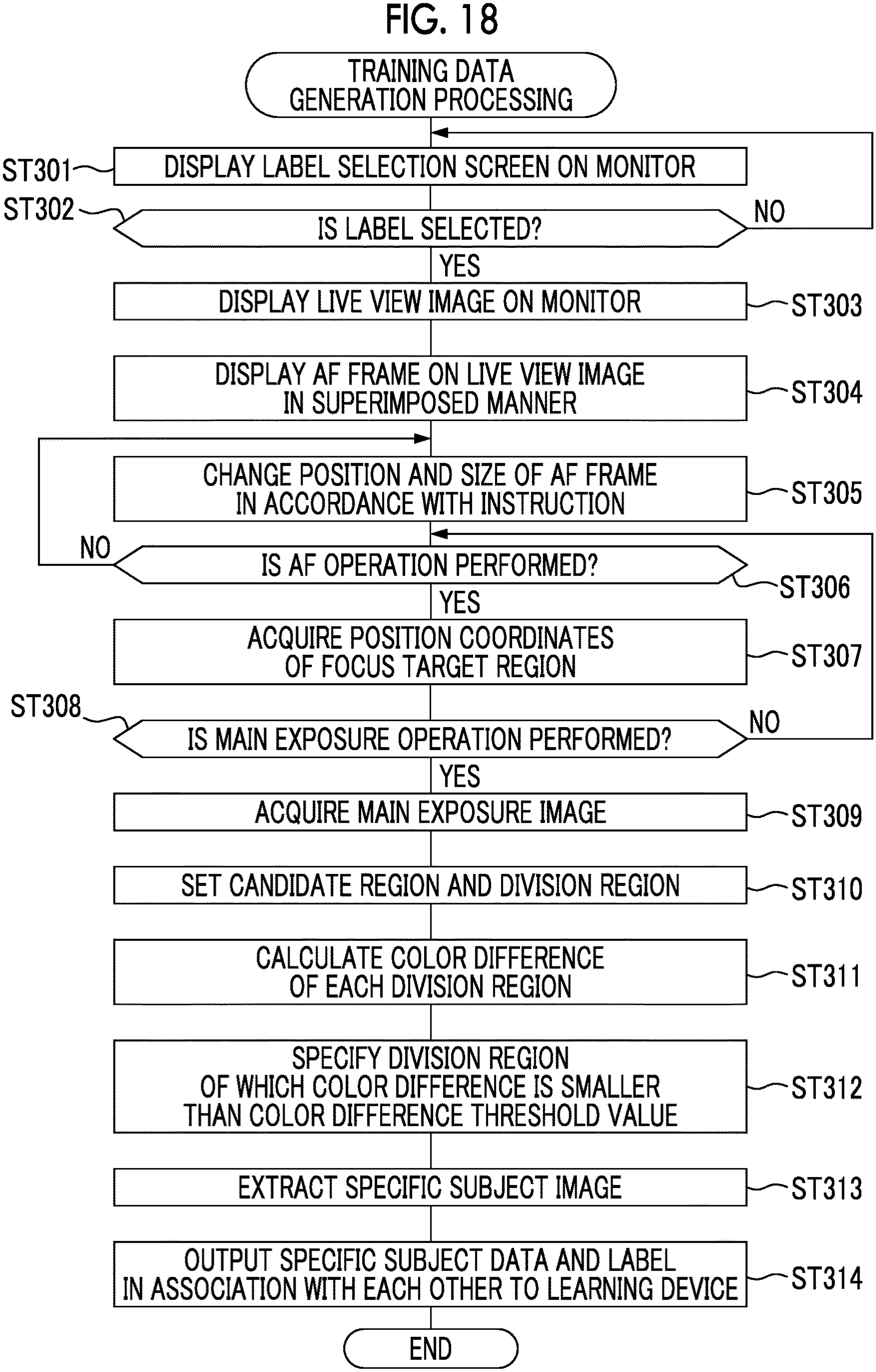
FIG. 18 is a flowchart showing an example of a flow of the training data generation processing performed by the information processing apparatus according to the third embodiment.

Next, an action of the imaging apparatus 12 according to the third embodiment will be described with reference to FIG. 18. FIG. 18 shows an example of a flow of the training data generation processing according to the third embodiment.

In FIG. 18, since steps ST301 to ST309 are the same as steps ST101 to ST109 in FIG. 11, the description thereof will be omitted. In addition, in FIG. 18, since step ST310 is the same as step ST210 in FIG. 16, the description thereof will be omitted.

In step ST311 the training data generation unit 53 calculates the color difference of each division region D. Thereafter, the training data generation processing proceeds to step ST312.

In step ST312, the training data generation unit 53 specifies the division region D of which the color difference is smaller than the color difference threshold value. Thereafter, the training data generation processing proceeds to step ST313.

In step ST313, the training data generation unit 53 extracts the specific subject image S from the main exposure image P based on the specified division region D. In addition, the training data generation unit 53 acquires the position coordinates of the extracted specific subject image S. Thereafter, the training data generation processing proceeds to step ST314.

In step ST314, the training data generation unit 53 outputs the specific subject data and the label L in association with each other to the learning device 14. The specific subject data is data including the main exposure image P and the position coordinates of the specific subject image S. The learning device 14 stores the received specific subject data and label L in the database 16 as the training data 17. As a result, the training data generation processing ends.

As described above, in the third embodiment, the color difference between the focus target region F and each division region D is used as the similarity evaluation value. Therefore, with the present configuration, the training data generation unit 53 can more easily extract the specific subject image S from the main exposure image P than in a case in which the color difference between the focus target region F and each division region D is not used.

It should be noted that, in the third embodiment, the training data generation unit 53 uses the color difference between the focus target region F and each division region D as the similarity evaluation value, but the technology of the present disclosure is not limited to this. The training data generation unit 53 may use a difference of chroma saturation between the focus target region F and each division region D as the similarity evaluation value, in addition to the color difference between the focus target region F and each division region D or instead of the color difference.

Fourth Embodiment

In a fourth embodiment, the training data generation unit 53 extracts the specific subject image S from the main exposure image P by using both the inter-focus position distance and the color difference. The configuration of the imaging apparatus 12 according to the fourth embodiment is the same as that of the first embodiment, and thus the description thereof will be omitted. In addition, the method of calculating the inter-focus position distance and the color difference according to the fourth embodiment is the same as that of the second and third embodiments, and thus the description thereof will be omitted.

Figure 19:
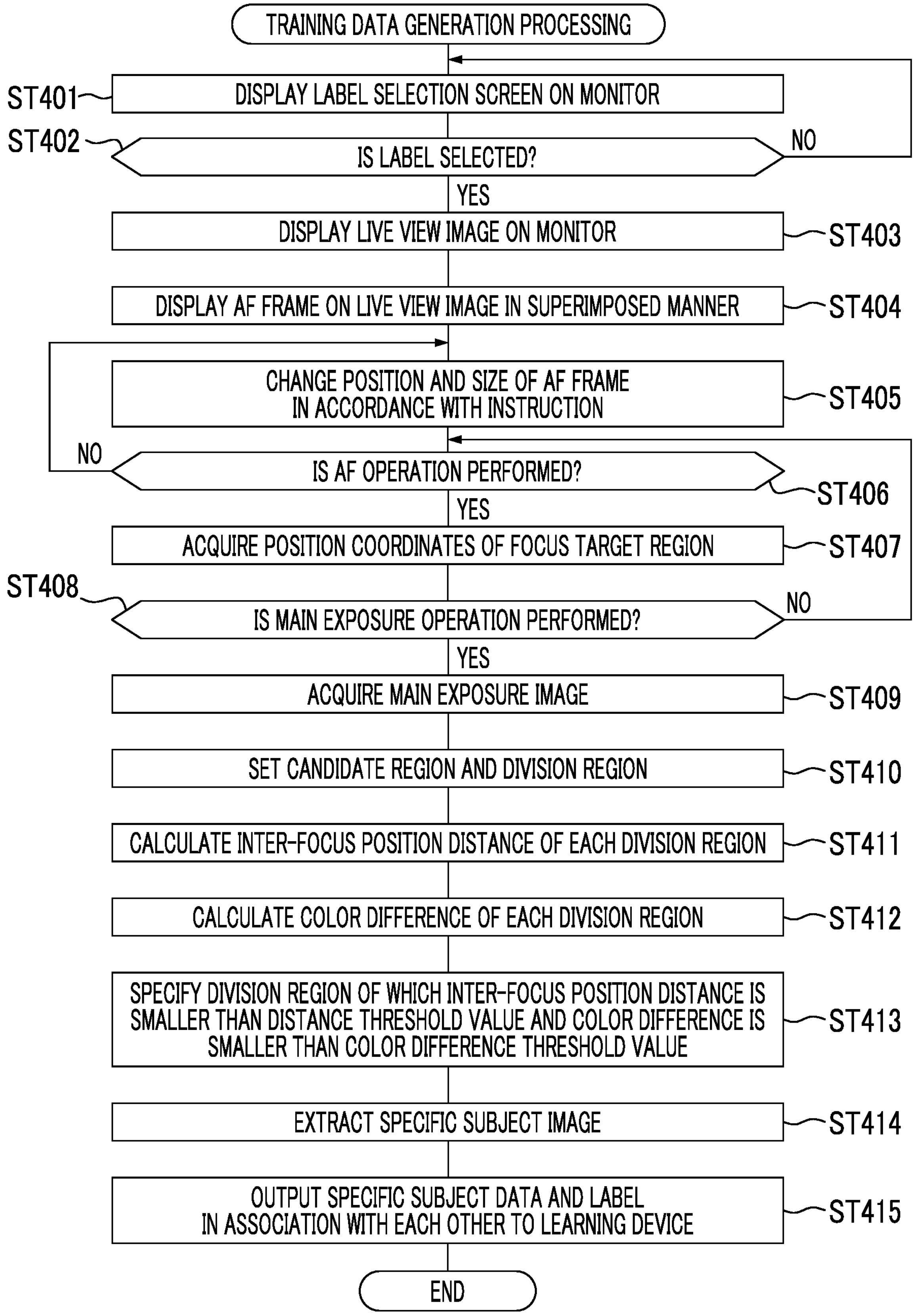
FIG. 19 is a flowchart showing an example of a flow of the training data generation processing performed by the information processing apparatus according to a fourth embodiment.

An action of the imaging apparatus 12 according to the fourth embodiment will be described with reference to FIG. 19. FIG. 19 shows an example of a flow of the training data generation processing according to the fourth embodiment.

In FIG. 19, since steps ST401 to ST409 are the same as steps ST101 to ST109 in FIG. 11, the description thereof will be omitted. In addition, in FIG. 19, since step ST410 is the same as step ST210 in FIG. 16, the description thereof will be omitted.

In step ST411, the training data generation unit 53 calculates the inter-focus position distance of each division region D. Thereafter, the training data generation processing proceeds to step ST412.

In step ST412 the training data generation unit 53 calculates the color difference of each division region D. Thereafter, the training data generation processing proceeds to step ST413.

In step ST413, the training data generation unit 53 specifies the division region D of which the inter-focus position distance is smaller than the distance threshold value and the color difference is smaller than the color difference threshold value. Thereafter, the training data generation processing proceeds to step ST414.

In step ST414, the training data generation unit 53 extracts the specific subject image S from the main exposure image P based on the specified division region D. In addition, the training data generation unit 53 acquires the position coordinates of the extracted specific subject image S. Thereafter, the training data generation processing proceeds to step ST415.

In step ST415, the training data generation unit 53 outputs the specific subject data and the label L in association with each other to the learning device 14. The learning device 14 stores the received specific subject data and label L in the database 16 as the training data 17.

As a result, the training data generation processing ends.

As described above, in the fourth embodiment, both the inter-focus position distance and the color difference are used as the similarity evaluation value. Therefore, with the present configuration, the training data generation unit 53 can more accurately extract the specific subject image S from the main exposure image P than in a case in which both the inter-focus position distance and the color difference are not used.

Fifth Embodiment

A fifth embodiment is effective in a case in which the specific subject is, for example, a moving object. In the fifth embodiment, in a case in which the specific subject is moved from the AF operation to the main exposure operation and a reliability degree of the specific subject image S extracted from the main exposure image P is determined to be low, warning information indicating that the reliability degree is low is given to the specific subject data. In the following, the fifth embodiment will be described with reference to FIGS. 20 to 22. It should be noted that the configuration of the imaging apparatus 12 according to the fifth embodiment is the same as that of the first embodiment, and thus the description thereof will be omitted.

Figure 20:
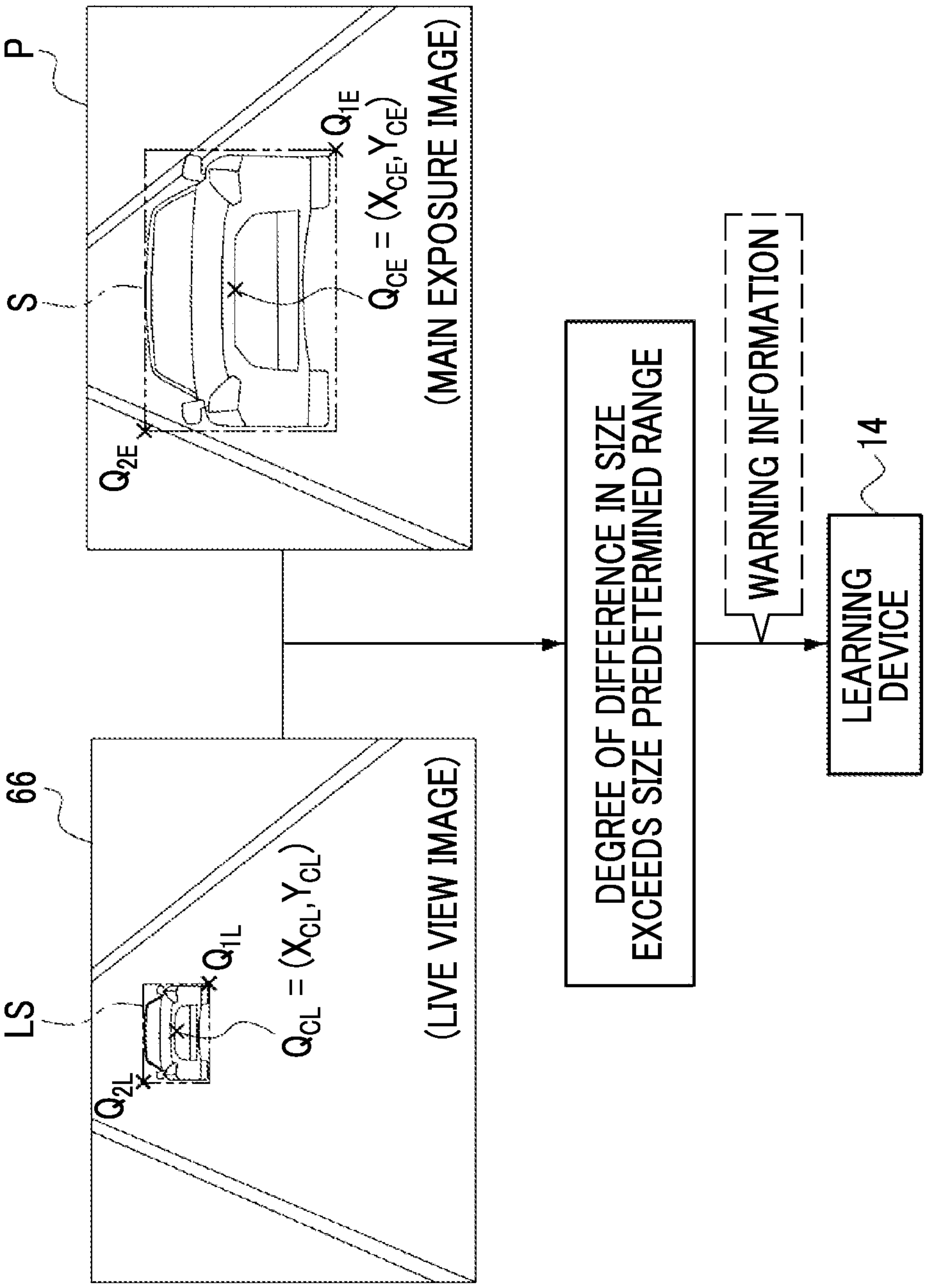
FIG. 20 is an explanatory diagram showing an example of an aspect in which the information processing apparatus according to a fifth embodiment outputs warning information to a learning device in a case in which a degree of difference in a size of the specific subject image between the live view image and the main exposure image exceeds a size predetermined range.

As an example, as shown in FIG. 20, in a case in which the user 11 performs the AF operation, the training data generation unit 53 acquires, for example, one frame of the live view images 66 continuously captured at a frame rate of 60 fps. The training data generation unit 53 extracts an image indicating the specific subject (hereinafter, referred to as a "live view specific subject image LS") in the live view image 66 of one frame based on the inter-focus position distance described in the second embodiment and/or the color difference described in the third embodiment. It should be noted that the live view specific subject image LS is an example of a "specific subject image for display" according to the technology of the present disclosure.

The training data generation unit 53 obtains coordinates of a lower right angle $Q_{1L}$ and an upper left angle $Q_{2L}$ of the extracted live view specific subject image LS as the position coordinates of the live view specific subject image LS. In addition, the training data generation unit 53 obtains a size of the live view specific subject image LS and coordinates $(X_{CL},Y_{CL})$ of a center point $Q_{CL}$ of the live view specific subject image LS (hereinafter, referred to as "center coordinates of the live view specific subject image LS") based on the position coordinates of the live view specific subject image LS.

Thereafter, in a case in which the user 11 performs the main exposure operation, the training data generation unit 53 acquires the main exposure image P. The training data generation unit 53 extracts the specific subject image S from the main exposure image P in the same method as the extraction of the live view specific subject image LS.

The training data generation unit 53 obtains the coordinates of a lower right angle $Q_{1E}$ and an upper left angle $Q_{2E}$ of the extracted specific subject image S as the position coordinates of the specific subject image S. In addition, the training data generation unit 53 obtains a size of the specific subject image S and coordinates $(X_{CE},Y_{CE})$ of a center point $Q_{CE}$ of the specific subject image S (hereinafter, referred to as "center coordinates of the specific subject image S") based on the position coordinates of the specific subject image S.

The training data generation unit 53 calculates a degree of difference in size between the live view specific subject image LS and the specific subject image S by comparing the size of the live view specific subject image LS with the size of the specific subject image S. As an example, as shown in FIG. 20, in a case in which the calculated degree of difference in size exceeds a size predetermined range which is determined in advance, the training data generation unit 53 outputs the warning information for warning that the reliability degree of the extracted specific subject image S is low to the learning device 14 together with the specific subject data and the label L. It should be noted that the degree of difference in size is an example of a "degree of difference" according to the technology of the present disclosure. In addition, the size predetermined range is an example of a "second predetermined range" according to the technology of the present disclosure. In addition, the processing of outputting the warning information is an example of "abnormality detection processing" according to the technology of the present disclosure.

Figure 21:
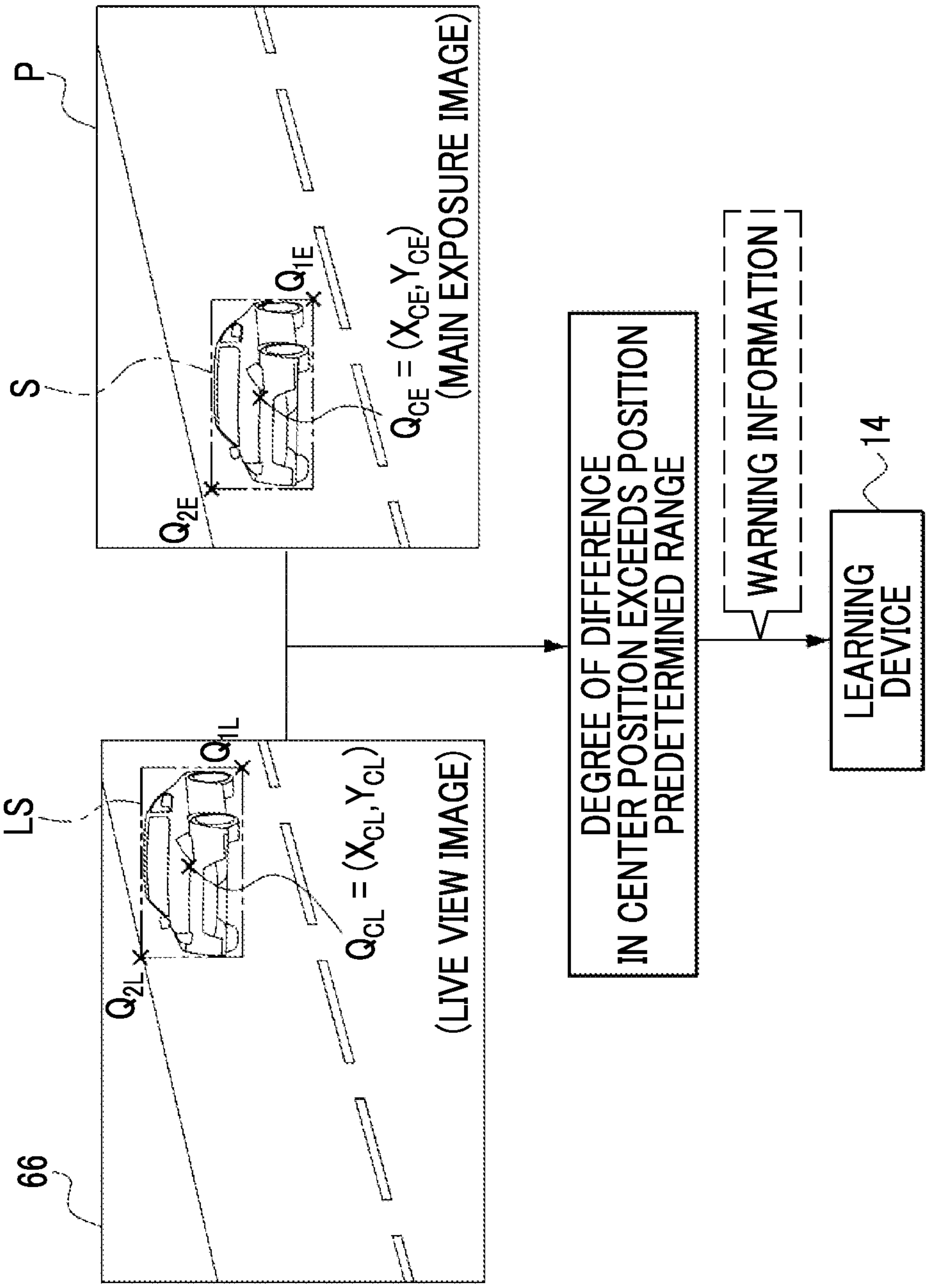
FIG. 21 is an explanatory diagram showing an example of an aspect in which the information processing apparatus according to the fifth embodiment outputs the warning information to the learning device in a case in which a degree of difference in center position of the specific subject image between the live view image and the main exposure image exceeds a position predetermined range.

In addition, the training data generation unit 53 calculates a degree of difference in center position between the live view specific subject image LS and the specific subject image S by comparing the center coordinates of the live view specific subject image LS with the center coordinates of the specific subject image S. As an example, as shown in FIG. 21, in a case in which the calculated degree of difference in center position exceeds the position predetermined range which is determined in advance, the training data generation unit 53 outputs the warning information for warning that the reliability degree of the extracted specific subject image S is low to the learning device 14 together with the specific subject data and the label L. It should be noted that the degree of difference in center position is an example of a "degree of difference" according to the technology of the present disclosure. In addition, the position predetermined range is an example of a "second predetermined range" according to the technology of the present disclosure.

Figure 22A:
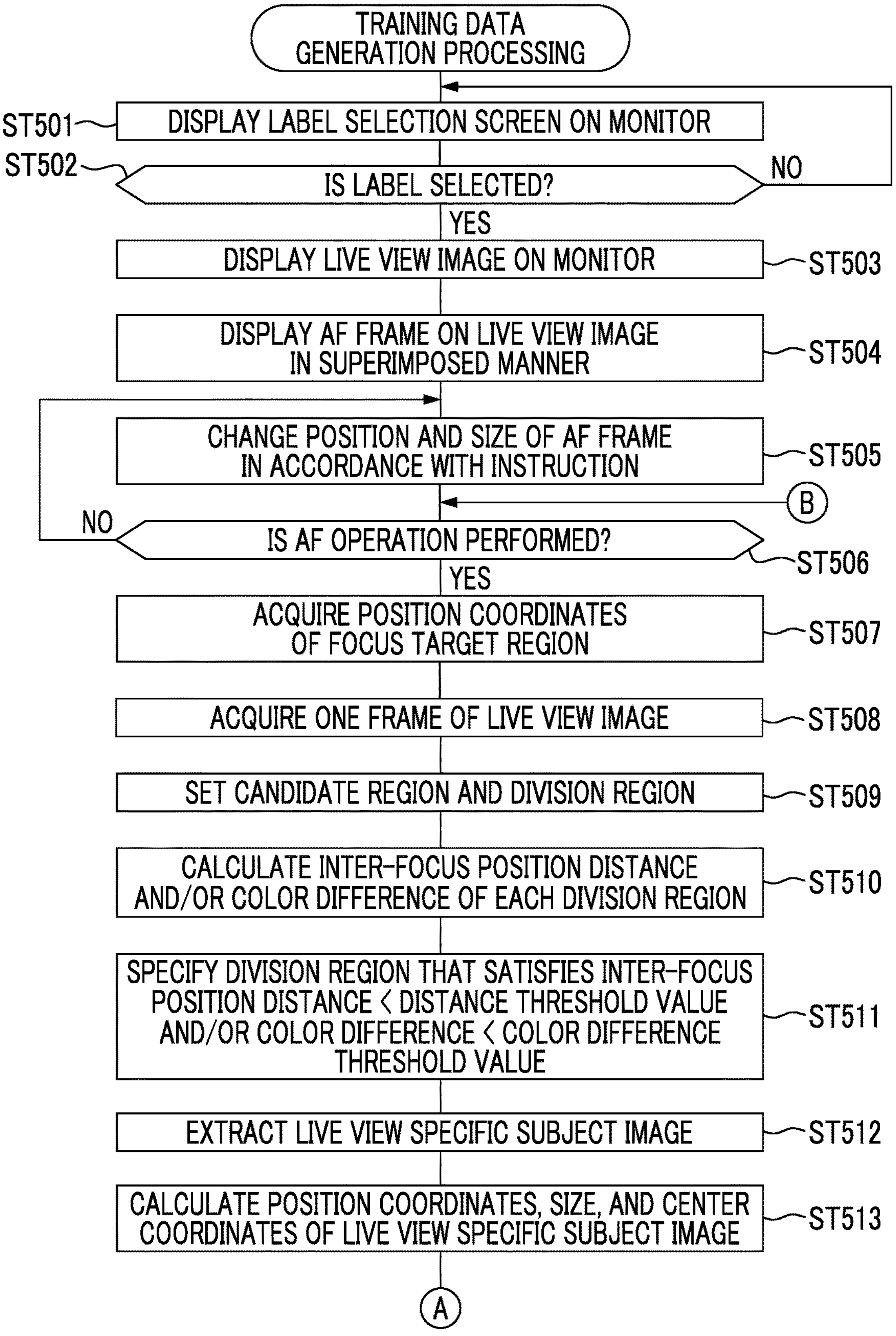
FIG. 22A is a flowchart showing an example of a flow of the training data generation processing performed by the information processing apparatus according to the fifth embodiment.

An action of the imaging apparatus 12 according to the fifth embodiment will be described with reference to FIGS. 22A and 22B. FIGS. 22A and 22B show examples of a flow of the training data generation processing according to the fifth embodiment.

In FIG. 22A, since steps ST501 to ST507 are the same as steps ST101 to ST107 in FIG. 11, the description thereof will be omitted.

In step ST508, the training data generation unit 53 acquires one frame of the live view image 66. Thereafter, the training data generation processing proceeds to step ST509.

In step ST509, the training data generation unit 53 sets the candidate region 78 and the division region D in the acquired live view image 66 of one frame. Thereafter, the training data generation processing proceeds to step ST510.

In step ST510, the training data generation unit 53 calculates the inter-focus position distance and/or the color difference of each division region D. Thereafter, the training data generation processing proceeds to step ST511.

In step ST511, the training data generation unit 53 specifies the division region D that satisfies "inter-focus position distance<distance threshold value" and/or "color difference<color difference threshold value". Thereafter, the training data generation processing proceeds to step ST512.

In step ST512, the training data generation unit 53 extracts the live view specific subject image LS from the live view image 66 of one frame based on the specified division region D. Thereafter, the training data generation processing proceeds to step ST513.

In step ST513, the training data generation unit 53 calculates the position coordinates, the size, and the center coordinates of the live view specific subject image LS. Thereafter, the training data generation processing proceeds to step ST514.

In step ST514, the training data generation unit 53 determines whether or not the main exposure is performed. In a case in which the main exposure is performed in step ST514, a positive determination is made, and the training data generation processing proceeds to step ST515. In step ST514, in a case in which the main exposure is not performed, a negative determination is made, and the training data generation processing proceeds to step ST506.

In step ST515, the training data generation unit 53 acquires the main exposure image P. Thereafter, the training data generation processing proceeds to step ST516.

In step ST516, the training data generation unit 53 sets the candidate region 78 and the division region D in the main exposure image P. Thereafter, the training data generation processing proceeds to step ST517.

In step ST517, the training data generation unit 53 calculates the inter-focus position distance and/or the color difference of each division region D. Thereafter, the training data generation processing proceeds to step ST518.

In step ST518, the training data generation unit 53 specifies the division region D that satisfies "inter-focus position distance<distance threshold value" and/or "color difference<color difference threshold value". Thereafter, the training data generation processing proceeds to step ST519.

In step ST519, the training data generation unit 53 extracts the specific subject image S from the main exposure image P based on the specified division region D. Thereafter, the training data generation processing proceeds to step ST520.

In step ST520, the training data generation unit 53 calculates the position coordinates, the size, and the center coordinates of the specific subject image S. Thereafter, the training data generation processing proceeds to step ST521.

In step ST521, the training data generation unit 53 calculates the degree of difference in size between the live view specific subject image LS and the specific subject image S by comparing the size of the live view specific subject image LS with the size of the specific subject image S. Thereafter, the training data generation processing proceeds to step ST522.

In step ST522, the training data generation unit 53 determines whether or not the calculated degree of difference in size is within the size predetermined range. In step ST522, in a case in which the degree of difference in size is within the size predetermined range, a positive determination is made, and the training data generation processing proceeds to step ST523. In step ST522, in a case in which the degree of difference in size exceeds the size predetermined range, a negative determination is made, and the training data generation processing proceeds to step ST526.

In step ST523, the training data generation unit 53 calculates the degree of difference in center position between the live view specific subject image LS and the specific subject image S by comparing the center position of the live view specific subject image LS with the center position of the specific subject image S. Thereafter, the training data generation processing proceeds to step ST524.

In step ST524, the training data generation unit 53 determines whether or not the calculated degree of difference in center position is within the position predetermined range. In step ST524, in a case in which the degree of difference in center position is within the position predetermined range, a positive determination is made, and the training data generation processing proceeds to step ST525. In step ST524, in a case in which the degree of difference in center position exceeds the position predetermined range, a negative determination is made, and the training data generation processing proceeds to step ST526.

In step ST525, the training data generation unit 53 outputs the specific subject data and the label L in association with each other to the learning device 14. The specific subject data is data including the main exposure image P and the position coordinates of the specific subject image S. On the other hand, in step ST526, the training data generation unit 53 outputs the warning information to the learning device 14, in addition to the specific subject data and the label L. As a result, the training data generation processing ends.

As described above, according to the fifth embodiment, the training data generation unit 53 outputs the warning information to the learning device 14 in a case in which the degree of difference in size between the live view specific subject image LS extracted from the live view image 66 and the specific subject image S extracted from the main exposure image P exceeds the size predetermined range, or in a case in which the degree of difference in center position between the live view specific subject image LS and the specific subject image S exceeds the position predetermined range. Therefore, since the specific subject data related to the specific subject image S determined to have a low reliability degree is output to the learning device 14 by giving the warning information thereto, the quality of the training data 17 is improved as compared with a case in which the warning information is not given.

It should be noted that, in the fifth embodiment, the training data generation unit 53 outputs the specific subject data related to the specific subject image S determined to have a low reliability degree to the learning device 14 by giving the warning information thereto, but the technology of the present disclosure is not limited to this. The training data generation unit 53 does not have to output the specific subject data related to the specific subject image S determined to have a low reliability degree to the learning device 14. In addition, the training data generation unit 53 may output the specific subject data to the learning device 14 by giving a reliability degree number indicating the reliability degree with respect to the specific subject image S thereto. In this case, the learning device 14 does not have to receive the specific subject data having a low reliability degree number with reference to the reliability degree number.

Sixth Embodiment

In a sixth embodiment, the training data generation unit 53 causes the image sensor 24 to perform the main exposure operation at a plurality of focus positions and acquires the main exposure image P in which the focus target region F is out of focus (hereinafter, also referred to as an "out-of-focus image"), in addition to the main exposure image P in which the focus target region F is in focus (hereinafter, also referred to as a "focus image"). The training data generation unit 53 outputs the specific subject data related to the specific subject image S reflected in the out-of-focus image as the training data 17, in addition to outputting the specific subject data related to the specific subject image S reflected in the focus image as the training data 17. In the following, the sixth embodiment will be described with reference to FIGS. 23 to 25. It should be noted that the configuration of the imaging apparatus 12 according to the sixth embodiment is the same as that of the first embodiment, and thus the description thereof will be omitted.

Figure 23:
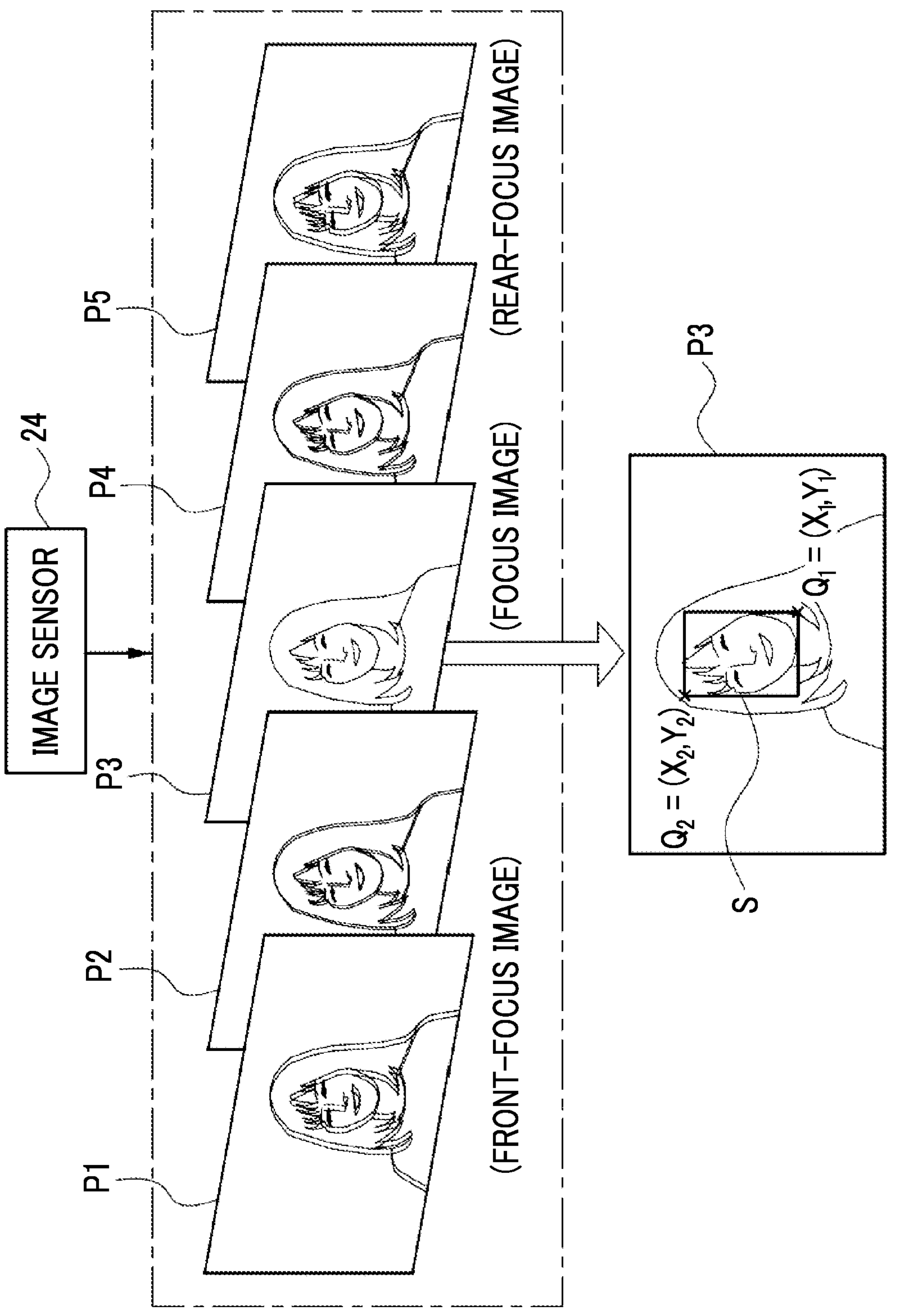
FIG. 23 is an explanatory diagram showing an example of an aspect in which the information processing apparatus according to a sixth embodiment decides the position coordinates of the specific subject image.

As shown in FIG. 23 as an example, the training data generation unit 53 causes the image sensor 24 to perform the main exposure operation at the plurality of focus positions including the focus position derived by performing the AF calculation based on the distance to the focus target region F. For example, in a case in which the imaging is performed with the position of the left eye of the specific subject A as the focus target region F (see FIG. 12), the training data generation unit 53 causes the image sensor 24 to perform the main exposure operation at five focus positions including the focus position derived based on the distance to the focus target region F. It should be noted that the five focus positions are an example of a "plurality of focus positions" according to the technology of the present disclosure.

As a result, the image sensor 24 outputs main exposure images (out-of-focus images) P1, P2, P4, and P5 in which the specific subject A is out of focus, in addition to a main exposure image (focus image) P3 in which the specific subject A is in focus. The out-of-focus images P1 and P2 are front-focus images in which a subject closer to the imaging apparatus 12 than the specific subject A is in focus. In addition, the out-of-focus images P4 and P5 are rear-focus images in which a subject farther from the imaging apparatus 12 than the specific subject A is in focus. It should be noted that the focus image P3 is an example of a "focus image" according to the technology of the present disclosure. The out-of-focus images P1, P2, P4, and P5 are examples of an "out-of-focus images" according to the technology of the present disclosure.

The training data generation unit 53 extracts the specific subject image S from the focus image P3 based on the inter-focus position distance described in the second embodiment and/or the color difference described in the third embodiment. In addition, the training data generation unit 53 obtains the position coordinates of the extracted specific subject image S.

As an example, as shown in FIG. 24, the training data generation unit 53 outputs the focus image P3, the position coordinates of the specific subject image S, and the label L in association with each other to the learning device 14 as training data 17-3.

In addition, the training data generation unit 53 outputs each out-of-focus image P1, P2, P4, or P5, the position coordinates of the specific subject image S extracted from the focus image P3, and the label L in association with each other to the learning device 14 as training data 17-1, 17-2, 17-4, or 17-5. That is, the training data generation unit 53 outputs the position coordinates of the specific subject image S extracted from the focus image P3 as the position coordinates of the specific subject image S in the out-of-focus image P1, P2, P4, or P5. The learning device 14 receives the training data 17-1 to 17-5 and stores the received training data 17-1 to 17-5 in the database 16.

An action of the imaging apparatus 12 according to the sixth embodiment will be described with reference to FIG. 25. FIG. 25 shows an example of a flow of the training data generation processing according to the sixth embodiment.

In FIG. 25, since steps ST601 to ST607 are the same as steps ST101 to ST107 in FIG. 11, the description thereof will be omitted.

In step ST608, the training data generation unit 53 determines whether or not the main exposure operation is performed. In step ST608, in a case in which the main exposure operation is performed, a positive determination is made, the main exposure operation is performed at the plurality of focus positions including the focus position based on the distance to the focus target region F, and the training data generation processing proceeds to step ST609. In step ST608, in a case in which the main exposure operation is not performed, a negative determination is made, and the training data generation processing proceeds to step ST606.

In step ST609, the training data generation unit 53 acquires a plurality of main exposure images P1 to P5. Among the plurality of main exposure images P1 to P5, the main exposure image P3 is the focus image, and the main exposure images P1, P2, P4, and P5 are the out-of-focus images. Thereafter, the training data generation processing proceeds to step ST610.

In step ST610, the training data generation unit 53 sets the candidate region 78 and the division region D in the focus image P3. Thereafter, the training data generation processing proceeds to step ST611.

In step ST611, the training data generation unit 53 calculates the inter-focus position distance and/or the color difference of each division region D. Thereafter, the training data generation processing proceeds to step ST612.

In step ST612, the training data generation unit 53 specifies the division region D of which the inter-focus position distance is smaller than the distance threshold value and/or the color difference is smaller than the color difference threshold value. Thereafter, the training data generation processing proceeds to step ST613.

In step ST613, the training data generation unit 53 extracts the specific subject image S from the main exposure image (focus image) P3 based on the specified division region D. Thereafter, the training data generation processing proceeds to step ST614.

In step ST614, the training data generation unit 53 acquires the position coordinates of the specific subject image S. Thereafter, the training data generation processing proceeds to step ST615.

In step ST615, the specific subject data and the label L are output in association with each other to the learning device 14. The specific subject data is data including each of the main exposure images P1 to P5 and the position coordinates of the specific subject image S extracted from the main exposure image P3. Therefore, in the sixth embodiment, by executing the training data generation processing once, five types of specific subject data are output. The learning device 14 stores the specific subject data and the label L in association with each other in the database 16. As a result, the training data generation processing ends.

As described above, in the sixth embodiment, the image sensor 24 performs the main exposure operation at the plurality of focus positions. For each of the plurality of main exposure images P1 to P5 obtained by performing the main exposure operation, the training data generation unit 53 outputs the position coordinates of the specific subject image S obtained from the focus image P3 as the position coordinates of the specific subject image S in each of the out-of-focus images P1, P2, P4, and P5. Therefore, with the present configuration, the training data generation unit 53 can more easily acquire the specific subject data related to the specific subject image S included in the focus image P3 and the specific subject data related to the specific subject image S included in each of the out-of-focus images P1, P2, P4, and P5 than in a case in which the specific subject image S is manually extracted.

In addition, with the present configuration, the training data generation unit 53 can individually give the labels to the plurality of main exposure images P1 to P5 by selecting the label L once. As a result, it is possible to save the time and effort of giving the labels L to the plurality of main exposure images P1 to P5. In addition, the training data generation unit 53 may give the label L to the main exposure images P1 to P5 after the imaging. In this case as well, it is desirable that the labels L be given to the plurality of main exposure images P1 to P5, which are continuously captured, by selecting the label L once. In an attempt to individually give the label L after the imaging, there may be a problem that it is not possible to know what the image is, depending on how the out-of-focus image is blurred. However, such a problem can be solved by giving the same label L to the plurality of main exposure images P1 to P5, which are continuously captured, by selecting the label L once. In this case, it is desirable that the training data generation unit 53 give the label L selected for the focus image P3 to each of the out-of-focus images P1, P2, P4, and P5.

It should be noted that, in the sixth embodiment, in one main exposure operation, the training data generation unit 53 outputs five types of the specific subject data obtained by the imaging at five focus positions, but the technology of the present disclosure is not limited to this. The number of focus positions in which the image sensor 24 performs the imaging may be more or smaller than five. The training data generation unit 53 outputs the specific subject data for each type in accordance with the number of focus positions.

In addition, in the sixth embodiment, the training data generation unit 53 may give an AF evaluation value indicating a degree of out-of-focus to the specific subject data including the out-of-focus images P1, P2, P4, and P5. In addition, the training data generation unit 53 may give a label indicating "focus" or "out-of-focus" to the specific subject data based on the AF evaluation value. As a result, the quality of the training data 17 is improved as compared with a case in which the AF evaluation value is not given.

Figure 26:
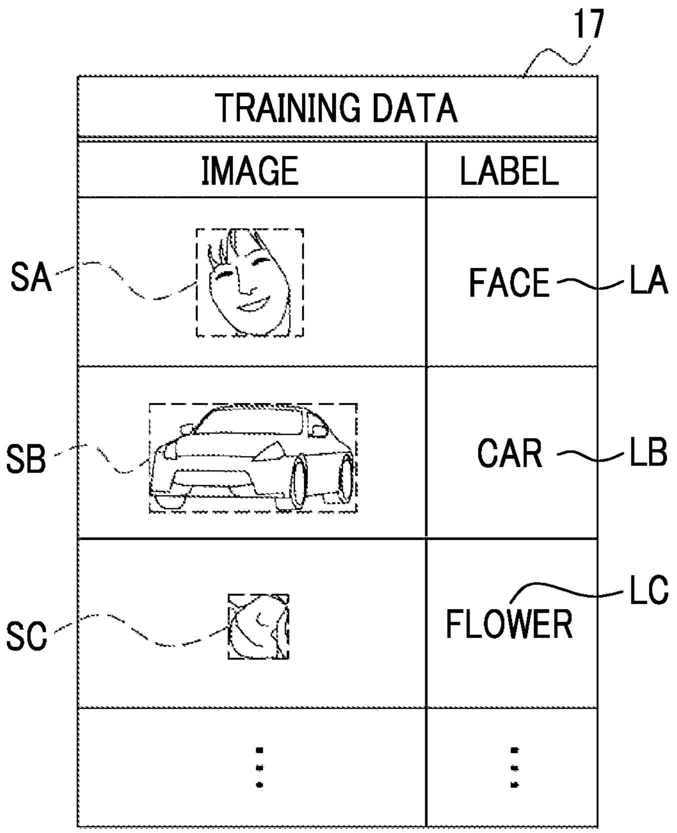
FIG. 26 is an explanatory diagram showing an example of the training data in a case in which the specific subject image is cut out from the main exposure image and output.

In the first to sixth embodiments, the specific subject data includes the main exposure image P and the position coordinates of the specific subject image S, but the technology of the present disclosure is not limited to this. As an example, as shown in FIG. 26, the specific subject data may be the specific subject image S cut out from the main exposure image P. The training data generation unit 53 outputs the specific subject image S cut out from the main exposure image P in association with the label L as the training data 17 used in the machine learning. With this configuration, the size of the output specific subject data is smaller than in a case in which the main exposure image P is output without being cut out. It should be noted that "the training data generation unit 53 outputs the specific subject data as the data used in the machine learning" specifically includes storage processing of storing the main exposure image P and the position coordinates of the specific subject image S or cut out processing of cutting out the specific subject image S from the main exposure image P by the training data generation unit 53.

In addition, in the first to sixth embodiments, the frame line 68A is rectangular, but the technology of the present disclosure is not limited to this, and the shape of the frame line 68A can be optionally changed.

In addition, in the first to sixth embodiments, the focus target region F is displayed in the aspect that is distinguishable from other image regions by setting the region surrounded by the AF frame 68 as the focus target region F, but the technology of the present disclosure is not limited to this. For example, the training data generation unit 53 may display an arrow on the live view image 66 and use a region indicated by the arrow as the focus target region F. In addition, for example, the training data generation unit 53 may receive the designation of the focus target region F by sensing the contact of the indicator with the touch panel 36, and display the designated focus target region F in a color that can be distinguished from other image regions.

In addition, in the first to sixth embodiments, the learning device 14 stores the training data 17 output from the imaging apparatus 12 in the database 16 and performs the machine learning using the training data 17 stored in the database 16, but the technology of the present disclosure is not limited to this. For example, the CPU 50A of the imaging apparatus 12 may store the training data 17 acquired by the imaging apparatus 12 itself in the NVM 50B and perform the machine learning using the training data 17 stored in the NVM 50B. With this configuration, since the imaging apparatus 12 can execute the acquisition of the training data 17 and the training, the number of the apparatuses is smaller than in a case in which the acquisition of the training data 17 and the training are performed by separate apparatuses.

In addition, in the first to sixth embodiments, in a case in which the imaging apparatus 12 is set in the training data imaging mode, the training data generation unit 53 displays the label selection screen 64 on the touch panel monitor 30 to cause the user 11 to select the label L before the AF operation and the main exposure operation, but the technology of the present disclosure is not limited to this. The training data generation unit 53 may cause the image sensor 24 to acquire the main exposure image P and then display the label selection screen 64 on the touch panel monitor 30 to receive the selection of the label L from the user 11.

In addition, in the first to sixth embodiments, the training data generation unit 53 outputs the specific subject data and the label L in association with each other to the learning device 14 as the training data 17 used in the supervised machine learning, but the technology of the present disclosure is not limited to this. The training data generation unit 53 may output only the specific subject data to the learning device 14. In this case, the user 11 may perform labeling on the specific subject data in the learning device 14. In addition, the labeling on the specific subject data does not have to be performed. In this case, the specific subject data may be used as the training data used in unsupervised machine learning, or may be used in pattern recognition technology in the related art.

In addition, in the first to sixth embodiments described above, the form example has been described in which the non-phase difference pixel group 86G and the phase difference pixel group 84G are used in combination, but the technology of the present disclosure is not limited to this. For example, an area sensor may be used in which the phase difference image data and the non-phase difference image data are selectively generated and read out instead of the non-phase difference pixel group 86G and the phase difference pixel group 84G. In this case, on the area sensor, a plurality of photosensitive pixels are two-dimensionally arranged. For the photosensitive pixels included in the area sensor, for example, a pair of independent photodiodes in which the light shielding member is not provided are used. In a case in which the non-phase difference image data is generated and read out, the photoelectric conversion is performed by the entire region of the photosensitive pixels (pair of photodiodes), and in a case in which the phase difference image data is generated and read out (for example, a case in which passive method distance measurement is performed), the photoelectric conversion is performed by at one photodiode of the pair of photodiodes. Here, one photodiode of the pair of photodiodes is a photodiode corresponding to the first phase difference pixel 84-L described in the above embodiment, and the other photodiode of the pair of photodiodes is a photodiode corresponding to the second phase difference pixel 84-R described in the above embodiment. It should be noted that the phase difference image data and the non-phase difference image data may be selectively generated and read out by all the photosensitive pixels included in the area sensor, but the technology of the present disclosure is not limited to this, and the phase difference image data and the non-phase difference image data may be selectively generated and read out by a part of the photosensitive pixels included in the area sensor.

In addition, in the first to sixth embodiments, the method of deriving the distance to the focus target region F has been described by taking the phase difference method as an example. However, the technology of the present disclosure is not limited to this, and a TOF method or a contrast method may be used.

Figure 27:
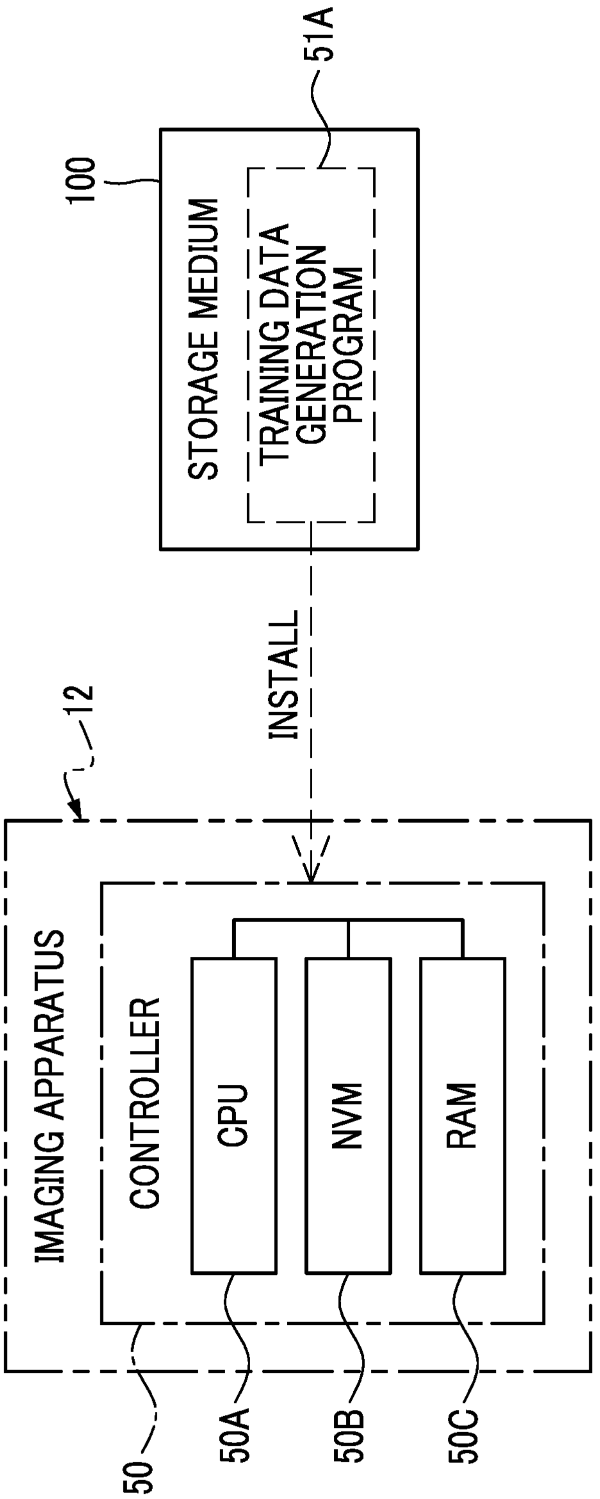
FIG. 27 is a block diagram showing an example of an aspect in which a training data generation program is installed in a controller in the imaging apparatus from a storage medium in which the training data generation program is stored.

In addition, in the first to sixth embodiments, the form example has been described in which the training data generation program 51A is stored in the NVM 50B, but the technology of the present disclosure is not limited to this. For example, as shown in FIG. 27, the training data generation program 51A may be stored in a storage medium 100. The storage medium 100 is a non-transitory storage medium. Examples of the storage medium 100 include any portable storage medium, such as an SSD or a USB memory.

The training data generation program 51A, which is stored in the storage medium 100, is installed in the controller 50. The CPU 50A executes the training data generation processing in accordance with the training data generation program 51A.

In addition, the training data generation program 51A may be stored in a storage unit of another computer or server device connected to the controller 50 via a communication network (not shown), and the training data generation program 51A may be downloaded in response to a request of the imaging apparatus 12 and installed in the controller 50.

It should be noted that it is not required to store the entire training data generation program 51A in the storage unit of another computer or server device connected to the controller 50 or the storage medium 100, and a part of the training data generation program 51A may be stored.

In the example shown in FIG. 4, the aspect example is described in which the controller 50 is built in the imaging apparatus 12, but the technology of the present disclosure is not limited to this, and for example, the controller 50 may be provided outside the imaging apparatus 12.

In the example shown in FIG. 4, the CPU 50A is a single CPU, but may be a plurality of CPUs. In addition, a GPU may be applied instead of the CPU 50A.

In the example shown in FIG. 4, the controller 50 is described, but the technology of the present disclosure is not limited to this, and a device including an ASIC, an FPGA, and/or a PLD may be applied instead of the controller 50. In addition, a hardware configuration and a software configuration may be used in combination, instead of the controller 50.

As a hardware resource for executing the training data generation processing described in the embodiment, the following various processors can be used. Examples of the processor include a CPU which is a general-purpose processor functioning as the hardware resource for executing the training data generation processing by executing software, that is, a program. In addition, examples of the processor include a dedicated electric circuit which is a processor having a circuit configuration designed to be dedicated for executing specific processing, such as the FPGA, the PLD, or the ASIC. A memory is built in or connected to any processor, and any processor executes the training data generation processing by using the memory.

The hardware resource for executing the training data generation processing may be composed of one of these various processors, or may be composed of a combination (for example, a combination of a plurality of FPGAs or a combination of a CPU and an FPGA) of two or more processors of the same type or different types. In addition, the hardware resource for executing the training data generation processing may be one processor.

As a configuring example of one processor, first, there is a form in which one processor is composed of a combination of one or more CPUs and software and the processor functions as the hardware resource for executing the training data generation processing. Secondly, as represented by SoC, there is a form in which a processor that realizes the functions of the entire system including a plurality of hardware resources for executing the training data generation processing with one IC chip is used. As described above, the training data generation processing is realized by using one or more of the various processors as the hardware resources.

Further, as the hardware structure of these various processors, more specifically, it is possible to use an electric circuit in which circuit elements, such as semiconductor elements, are combined. In addition, the training data generation processing described above is merely an example. Therefore, it is needless to say that the deletion of an unneeded step, the addition of a new step, and the change of a processing order may be employed within a range not departing from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unneeded parts may be deleted, new elements may be added, or replacements may be made with respect to the description contents and the shown contents above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be incorporated by reference.

What is claimed is:

1. An information processing apparatus comprising:

a processor; and a memory connected to or built in the processor, wherein, the processor displays a plurality of label candidates on a screen for selection and receives a selected label among the plurality of label candidates, wherein each of the plurality of label candidates is a class of a subject image, in a case in which imaging accompanied by a focus operation in which a specific subject is used as a focus target region is performed by an image sensor, the processor extracts an image of the focus target region as a specific subject image from a captured image obtained by the imaging, and generates training data comprising the specific subject data related to the specific subject image indicating the specific subject in a captured image obtained by the imaging, the selected label which is a class of the specific subject image, and coordinates of the focused target region in the captured image the processor transmits the generated training data to a computing device for machine learning.

2. The information processing apparatus according to claim 1, wherein the machine learning is supervised machine learning, and the processor gives a label, which is the class of the specific subject image, to the specific subject data, and outputs the specific subject data as the training data used in the supervised machine learning.

3. The information processing apparatus according to claim 1, wherein the processor displays the focus target region in an aspect that is distinguishable from other image regions in a state in which a video for display based on a signal output from the image sensor is displayed on a monitor, and the specific subject image is an image corresponding to a position of the focus target region in the captured image.

4. The information processing apparatus according to claim 3, wherein the processor displays the focus target region in the aspect that is distinguishable from the other image regions by displaying a frame that surrounds the focus target region in the video for display.

5. The information processing apparatus according to claim 4, wherein a position of the frame is changeable in accordance with a given position change instruction.

6. The information processing apparatus according to claim 4, wherein a size of the frame is changeable in accordance with a given size change instruction.

7. The information processing apparatus according to claim 1, wherein the processor displays a video for display based on a signal output from the image sensor on a monitor, receives designation of the focus target region in the video for display, and extracts the specific subject image based on a region of which a similarity evaluation value indicating a degree of similarity to the focus target region is within a first predetermined range in a predetermined region including the focus target region.

8. The information processing apparatus according to claim 7, wherein the processor displays the focus target region in an aspect that is distinguishable from other image regions.

9. The information processing apparatus according to claim 7, wherein at least one of the focus target region or the specific subject image is determined in units of division regions obtained by dividing the predetermined region.

10. The information processing apparatus according to claim 7, wherein the similarity evaluation value is a value based on a focus evaluation value used in the focus operation.

11. The information processing apparatus according to claim 7, wherein the similarity evaluation value is a color evaluation value based on color information of the predetermined region.

12. The information processing apparatus according to claim 7, wherein the processor performs abnormality detection processing in a case in which a degree of difference between a specific subject image for display indicating the specific subject in the video for display and the specific subject image exceeds a second predetermined range, and the specific subject image for display is determined based on the similarity evaluation value.

13. The information processing apparatus according to claim 1, wherein the specific subject data includes coordinates of the specific subject image, and the processor outputs the captured image and the coordinates of the specific subject image as the training data used in the machine learning.

14. The information processing apparatus according to claim 1, wherein the specific subject data is the specific subject image cut out from the captured image, and the processor outputs the cut out specific subject image as the training data used in the machine learning.

15. The information processing apparatus according to claim 1, wherein the processor stores the training data in the memory, and performs the machine learning using the training data stored in the memory.

16. The information processing apparatus of claim 1, wherein the coordinates of the focused target region are position coordinates of at least two corners of the focused target region in the captured image.

17. A learning device comprising:

a reception device that receives the training data output from the information processing apparatus according to claim 1; and an operation device that performs the machine learning using the training data received by the reception device.

18. An imaging apparatus comprising:

the information processing apparatus according to claim 1; and the image sensor.

19. The imaging apparatus according to claim 18, wherein the image sensor performs the imaging at a plurality of focus positions, and for a plurality of the captured images obtained by performing the imaging, the processor outputs coordinates of the specific subject image obtained from a focus image in which the specific subject is in focus as coordinates of the specific subject image in an out-of-focus image in which the specific subject is not in focus.

20. A control method of an information processing apparatus, the method comprising:

displaying a plurality of label candidates on a screen for selection and receiving a selected label among the plurality of label candidates, wherein each of the plurality of label candidates is a class of a subject image;

in a case in which imaging accompanied by a focus operation in which a specific subject is used as a focus target region is performed by an image sensor, extracting an image of the focus target region as a specific subject image from a captured image obtained by the imaging, and generating training data comprising the specific subject data related to the specific subject image indicating the specific subject in a captured image obtained by the imaging, the selected label which is a class of the specific subject image, and coordinates of the focused target region in the captured image; and transmitting the generated training data to a computing device for machine learning.

21. A non-transitory computer-readable storage medium storing a program executable by a computer to perform a process comprising:

displaying a plurality of label candidates on a screen for selection and receiving a selected label among the plurality of label candidates, wherein each of the plurality of label candidates is a class of a subject image;

in a case in which imaging accompanied by a focus operation in which a specific subject is used as a focus target region is performed by an image sensor, extracting an image of the focus target region as a specific subject image from a captured image obtained by the imaging, and generating training data comprising the specific subject data related to the specific subject image indicating the specific subject in a captured image obtained by the imaging, the selected label which is a class of the specific subject image, and coordinates of the focused target region in the captured image; and transmitting the generated training data to a computing device for machine learning.

* * * * *